United States Patent
He et al.

(10) Patent No.: US 9,596,027 B2
(45) Date of Patent: Mar. 14, 2017

(54) SIGNAL DEFORMATION MEASUREMENT ON POLARIZATION-MULTIPLEXED SIGNALS

(71) Applicant: EXFO Inc., Quebec (CA)

(72) Inventors: Gang He, Quebec (CA); Daniel Gariepy, Quebec (CA); Mats Skold, Goteborg (SE)

(73) Assignee: Exfo Inc., Quebec (CA)

( * ) Notice: Subject to any disclaimer, the term of this patent is extended or adjusted under 35 U.S.C. 154(b) by 25 days.

(21) Appl. No.: 14/268,144

(22) Filed: May 2, 2014

(65) Prior Publication Data
US 2014/0328586 A1   Nov. 6, 2014

Related U.S. Application Data

(60) Provisional application No. 61/818,952, filed on May 3, 2013.

(51) Int. Cl.
*H04B 10/079* (2013.01)
*H04J 14/06* (2006.01)

(52) U.S. Cl.
CPC ........ *H04B 10/07953* (2013.01); *H04J 14/06* (2013.01)

(58) Field of Classification Search
CPC ........... H04J 14/06; H04B 10/0793–10/07957; H04B 10/2513–10/2531;
(Continued)

(56) References Cited

U.S. PATENT DOCUMENTS

| | | | |
|---|---|---|---|
| 6,636,306 B2 | 10/2003 | He et al. | |
| 6,898,001 B2 * | 5/2005 | Ishihara | H04B 10/0731 359/337 |

(Continued)

FOREIGN PATENT DOCUMENTS

| | | | | |
|---|---|---|---|---|
| WO | WO2008122123 | 10/2008 | | |
| WO | WO2011020195 | 2/2011 | | |
| WO | WO2011/097734 | * 8/2011 | ....... H04B 10/07953 | |

OTHER PUBLICATIONS

Lee et al. "OSNR Monitoring Technique Using Polarization-Nulling Method", IEEE Photonics Technology Letters, vol. 13, No. 1, pp. 88-90 (Jan. 2001).

(Continued)

*Primary Examiner* — David Payne
*Assistant Examiner* — Casey Kretzer
(74) *Attorney, Agent, or Firm* — Helene Chotard

(57) ABSTRACT

There is provided a method and an apparatus for determining quality parameters on a polarization-multiplexed optical signal based on an analysis of the power spectral density of the Signal-Under-Test (SUT). The method is predicated upon knowledge of the spectral shape of the signal in the absence of significant noise or spectral deformation. This knowledge is provided by a reference optical spectrum trace. Based on this knowledge and under the assumption that ASE noise level is approximately constant in wavelength over a given spectral range, the spectral deformation of the signal contribution of the SUT may be estimated using a comparison of the spectral variations of the optical spectrum trace of the SUT with that of the reference optical spectrum trace.

21 Claims, 10 Drawing Sheets

(58) Field of Classification Search
CPC ............... H04B 10/2543–10/2572; H04B 10/073–10/0799; H04B 10/0795–10/07953
See application file for complete search history.

(56) References Cited

U.S. PATENT DOCUMENTS

| | | | | |
|---|---|---|---|---|
| 2003/0072513 | A1* | 4/2003 | Glingener | G02B 6/278 385/11 |
| 2004/0022547 | A1* | 2/2004 | Szafraniec | H04B 10/64 398/204 |
| 2004/0247319 | A1* | 12/2004 | Melman | H04B 10/077 398/65 |
| 2006/0291859 | A1* | 12/2006 | Young | H04J 14/0221 398/58 |
| 2012/0155861 | A1 | 6/2012 | Liu | |
| 2012/0201533 | A1 | 8/2012 | Gariepy et al. | |
| 2013/0028597 | A1* | 1/2013 | Ye | H04B 10/07953 398/26 |
| 2016/0072579 | A1* | 3/2016 | Schroeder | H04B 10/07953 398/26 |

OTHER PUBLICATIONS

Vacondio et al. "On Nonlinear Distortions of Highly Dispersive Optical Coherent Systems", Optics Express, vol. 20, No. 2, pp. 1022-1032 (Jan. 6, 2012).

Gariepy et al. "Non-Intrusive Measurement of In-Band OSNR of High Bitrate Polarization-Multiplexed Signals", Optical Fiber Technology, vol. 17, Issue 5, pp. 518-522 (Oct. 2011).

* cited by examiner

SIGNAL DEFORMATION MEASUREMENT ON POLARIZATION-MULTIPLEXED SIGNALS

CROSS-REFERENCE TO RELATED APPLICATIONS

This application claims priority under 35 USC§119(e) of U.S. provisional patent application 61/818,952 filed May 3, 2013; the specification of which is hereby incorporated by reference.

TECHNICAL FIELD

The invention relates to the determination of a quality parameter characterizing optical signals based on an analysis of the power spectral density of the signal. More specifically, the invention relates to the determination of a quality parameter characterizing polarization-multiplexed optical signals.

BACKGROUND OF THE ART

In order to maximize the information content transmitted over a prescribed spectral bandwidth (often measured in bits per Hz of spectral bandwidth), polarization multiplexing (also known as dual-polarization) is being increasingly used with new transmission formats. The underlying idea is that the spectral density (conveniently measured in units of bits/Hz) can be effectively doubled by employing two orthogonally polarized data-carrying signals sharing the same optical signal bandwidth. Normally, these two orthogonally polarized signals are transmitted with approximately the same intensity, rendering the total resultant light effectively unpolarized as seen from a test and measurement instrument having an electronic detection bandwidth significantly lower than the symbol rate of the polarization-multiplexed signal, such as is normally the case with Optical Spectrum Analyzers (OSA).

The Optical Signal-to-Noise Ratio (OSNR) is a conventional measure of the quality of a signal carried by an optical telecommunication link. Under normal and proper operating conditions, the OSNR of an optical communication link is typically high, often in excess of 15 dB or 20 dB, or even greater. The dominant component of the noise in an optical communication link is typically unpolarized Amplified Spontaneous Emission (ASE) noise, which is a spectrally broadband noise source contributed by the optical amplifiers in the link.

Some methods exist for characterizing ASE noise on optical telecommunication signals based on an in-band analysis of the optical signal. Such methods include methods referred to as "polarization-nulling" methods (see J. H. Lee et al., "OSNR Monitoring Technique Using Polarization-Nulling Method", IEEE Photonics Technology Letters, Vol. 13, No. 1, January 2001) as well as variants thereof, and the methods referred to as "differential polarization response" methods (see International Patent Application Publication WO 2008/122123 A1 to Gariepy et al.; and WO 2011/020195 A1 to He et al., both applications being commonly owned by the Applicant). However, such methods are based on the assumption that the signal is generally highly polarized, an assumption that is not valid in the case of polarization-multiplexed signals.

For the case of most polarization-multiplexed signals, the "signal", as detected on a photodiode having low bandwidth electronics for instance, appears unpolarized, and hence, these above-mentioned in-band OSNR measurement methods cannot be used to reliably provide the OSNR measurement.

In order to measure the noise level or the OSNR of a polarization-multiplexed signal in a multi-channel WDM network, for instance, system manufacturers and operators currently have to resort to turning off the signal at the transmitter in order to measure the noise level and thereby determine the OSNR. A first limitation of this method is that it requires making certain assumptions about the noise variations that occur upon turning off the signal for which the OSNR needs to be measured. The OSNR measurement uncertainty depends, for example, on the number of active channels on the link sharing the same amplified paths. For systems with live traffic, the necessary service interruption resulting from signal turn-off practically limits the use of this technique to a start of life characterization at the time of commissioning a system.

A method of measuring the noise level on polarization-multiplexed signals using an acquired optical spectrum trace of the signal was proposed by Gariepy et al. (see International Patent Application Publication WO 2011/097734 A1, commonly owned by The Applicant and hereby incorporated by reference). This method is based on the knowledge of the spectral shape of the data-carrying signal contribution provided by a reference signal. Based on this knowledge, the signal contribution and the ASE noise contribution that otherwise appear as merged together on the optical spectrum trace, may be mathematically discriminated from one another. Knowledge of the spectral shape of the signal contribution may come from the acquisition of a reference signal taken, for example, at a different point, generally upstream, along the same optical communication link (i.e. the reference signal originates from the same optical transmitter), where the OSNR is known or where the signal can be considered free of ASE noise. This method assumes that, within the optical signal bandwidth, the spectral shape of the signal does not significantly change along the communication link. The signal contribution of such a reference signal is therefore spectrally representative of the signal contribution of the signal-under-test.

However, spectral deformations mostly induced by Non-Linear Effects (NLE) have become more frequent in the case of new deployments using polarization multiplexing, because optimum performance in Bit Error Rate (BER) is obtained by increasing the power beyond the linear regime of optical fibers, non-linear effects therefore arising. As a consequence, signals are subjected to NLE-induced spectral deformations which impact the method proposed by Gariepy et al. Furthermore, aside from the ASE-noise level, non-linear effects now also significantly affect the overall system performance in terms of BER (see Vacondio et al, "On nonlinear distorsions of highly dispersive optical coherent systems", Optics Express, Vol. 20, No. 2, pp. 1022-1032 (2012)). Signal quality therefore cannot be assessed based only on the conventionally measured ASE noise level because proper performance indicators should also account for NLE-induced distortions to which a spectral deformation of the signal-under-test is correlated.

There is therefore a need for a method to determine quality parameters characterizing polarization-multiplexed signals subject to NLE-induced spectral deformation.

SUMMARY

It is an object of the present invention to provide a method for determining quality parameters on polarization-multiplexed signals which addresses the above concerns.

There are therefore provided a method and an apparatus for determining quality parameters, such as the ASE-only Optical Signal-to-Noise Ratio ($OSNR_{ASE}$) or the signal-deformation Optical Signal-to-Noise Ratio ($OSNR_{SD}$), on polarization-multiplexed optical signals based on an analysis of the power spectral density of the Signal-Under-Test (SUT). The method is predicated upon knowledge of the spectral shape of the signal in the absence of significant noise or spectral deformation. This knowledge is provided by a reference optical spectrum trace. Based on this knowledge and under the assumption that ASE noise level is approximately constant in wavelength over a given spectral range (i.e. the ASE noise variation is negligible compared to the signal contribution variation), the spectral deformation of the signal contribution of the SUT may be estimated using a comparison of the spectral variations (e.g. quantified as the derivative of the spectral shape) of the optical spectrum trace of the SUT with that of the reference optical spectrum trace.

The reference spectral shape may be determined from an optical spectrum trace of a reference signal acquired at a different point, generally upstream, along the same optical communication link (i.e. the reference signal originates from the same optical transmitter), where the signal does not suffer from NLE-induced spectral deformation and where the OSNR is known or the signal can be considered free of ASE noise.

Of the embodiments described herein, those which use a reference signal taken at a different point along the same optical communication link typically minimize the measurement uncertainties.

The spectral shape of the signal contribution may instead be deduced from an optical spectrum trace of a reference signal acquired on a different optical communication link within the network originating from an optical transmitter that is distinct but is optically equivalent to the optical transmitter at the source of the SUT. In this case, in order to characterize NLE-induced spectral deformation along the communication link, the reference signal should be taken close to the output of the optical transmitter i.e. before the signal is subjected to NLE-induced spectral deformation. For example, if another optical transmitter which is optically equivalent to that at the source of the SUT is present at the physical location where the SUT is characterized (on a communication link transmitting in the opposite direction for example), both the SUT and reference optical spectrum traces may be obtained at the same location. If the reference signal is taken at the output of the optical transmitter, i.e. before the signal is optically amplified, its noise contribution may be considered negligible.

As a further alternative, the spectral shape of the signal contribution may also be deduced from a prior acquisition of an optical spectrum trace of a reference signal originating from an optically-equivalent optical transmitter from any network.

In yet another alternative, the spectral shape of the signal contribution may also be deduced from a generic optical spectrum trace that is synthesized numerically from a simulated or empirically-known spectrally-resolved trace of a reference signal representative of the signal contribution of the SUT before being affected by NLE-induced or any other spectral deformation.

In some embodiments, the reference trace may be obtained from a generic optical transmitter at an optical wavelength that is different from that of the SUT. In this case, optical spectrum trace of the generic optical transmitter may be numerically processed to transform it appropriately to the central wavelength of the SUT and/or to scale it to take into account any difference in symbol rate ("baud") and/or overhead. The transformation may involve a translation as well as a scale transformation in the frequency domain followed by a resampling on the resolution grid of the optical spectrum analyzer that is used for the optical spectrum acquisition of the SUT.

It is however noted that it is very important that the reference trace be representative of the signal contribution of the SUT before being affected by NLE-induced spectral deformation, at least over a given spectral range of interest, thus allowing retrieval of a reference trace that is substantially identical (within the acquisition device repeatability) to the signal contribution of the SUT using only basic mathematical processing (such as a translation and a scale transformation). It has been shown that in at least some cases of 40G transmission applications, it is possible to obtain a sufficiently representative reference by employing a generic optical transmitter.

It is further noted that the provided method only requires knowledge of the spectral power density over the optical signal bandwidth, i.e. the relative distribution of the optical power, for both the SUT and the reference signal. No absolute power level value is required. Hence, the optical spectrum traces can be acquired via tap monitoring ports on the optical communication link for example, thus allowing non-intrusive measurement (i.e. without any service interruption).

In accordance with one aspect of the invention, there is provided a method for determining a quality parameter characterizing a polarization-multiplexed SUT propagating on an optical communication link and comprising at least a data-carrying signal contribution and an ASE-noise contribution within an optical signal bandwidth. The method comprises: obtaining a test optical spectrum trace of said optical signal-under-test corresponding to a test point along said optical communication link, said test optical spectrum trace extending over a spectral range encompassing at least a portion of said optical signal bandwidth; obtaining a reference optical spectrum trace corresponding to a reference signal; estimating a spectral deformation of said signal contribution of said signal-under-test compared to said reference optical spectrum trace, within said spectral range, using said reference optical spectrum trace and said test optical spectrum trace; and determining said quality parameter at least from the estimated spectral deformation.

In one embodiment, the quality parameter comprises either or both the signal-deformation-only Optical Signal-to-Noise Ratio ($OSNR_{SD}$) and the Signal Deformation Factor (SDF), both being defined hereinbelow. However, in other embodiments, other quality parameters that can be used to predict system performance alone, in mutual combination or in combination with other parameters, can be determined instead. Such quality parameters comprise ASE-only Optical Signal-to-Noise Ratio ($OSNR_{ASE}$), in-band ASE noise level, Bit Error Rate (BER), electrical signal-to-noise ratio, SDF($\lambda$), etc.

In accordance with a further aspect, the estimation of the spectral deformation of said signal contribution of said signal-under-test comprises calculating a ratio Rdev($\lambda$) of a derivative of said test optical spectrum trace and a derivative of said reference optical spectrum trace.

In accordance with a further aspect, the method for determining a quality parameter characterizing a polarization-multiplexed SUT comprises mathematically discriminating said ASE-noise contribution from said signal contribution in said SUT, within said optical signal bandwidth, using said reference optical spectrum trace and said test optical spectrum trace; and determining said quality parameter of said optical signal-under-test at least from the mathematically discriminated ASE-noise contribution.

In this case, discrimination of the ASE-noise contribution allows for calculating quality parameters characterizing or related to the ASE noise, such as, for example, the ASE-only Optical Signal-to-Noise Ratio ($OSNR_{ASE}$) or the in-band ASE noise level.

In accordance with another aspect of the invention, there is provided a non-transitory computer readable storage medium having stored thereon computer-readable instructions that, when executed by a computer, cause the computer to perform a method for determining a quality parameter characterizing a polarization-multiplexed SUT propagating on an optical communication link and comprising at least a data-carrying signal contribution and an ASE-noise contribution within an optical signal bandwidth. The method comprises: obtaining a test optical spectrum trace of said optical signal-under-test corresponding to a test point along said optical communication link, said test optical spectrum trace extending over a spectral range encompassing at least a portion of said optical signal bandwidth; obtaining a reference optical spectrum trace corresponding to a reference signal; estimating a spectral deformation of said signal contribution of said signal-under-test compared to said reference optical spectrum trace, within said spectral range, using said reference optical spectrum trace and said test optical spectrum trace; and determining said quality parameter at least from the estimated spectral deformation.

In accordance with yet another aspect of the invention, there is provided an apparatus for determining a quality parameter characterizing a polarization-multiplexed SUT propagating on an optical communication link, the SUT comprising at least a data-carrying signal contribution and an ASE-noise contribution within an optical signal bandwidth. The apparatus comprises: a measurement device for obtaining a test optical spectrum trace of said SUT corresponding to a test point along said optical communication link, said test optical spectrum trace extending over a spectral range encompassing at least a portion of said optical signal bandwidth; an input for receiving a reference optical spectrum trace corresponding to a reference signal; a processing unit for estimating a spectral deformation of said signal contribution of said SUT compared to said reference optical spectrum trace, within said spectral range, using said reference optical spectrum trace and said test optical spectrum trace; and an in-band noise determining unit for determining said quality parameter at least from the estimated spectral deformation.

In this specification, the expression "trace" is not to be construed limitatively to data that is displayed graphically, but is intended to encompass data which is not displayed graphically but nonetheless used for any suitable purpose. An "optical spectrum trace" refers to the spectrally-resolved optical power of a signal as obtained by acquisition using an Optical Spectrum Analyzer (OSA) for example, or obtained from any appropriate recorded data or numerically generated data.

In this specification, (vacuum) wavelength, denoted $\lambda$, will often be used interchangeably with optical frequency, denoted $\nu$. The relationship between a small optical-frequency difference, for instance within a narrow (e.g. 50-GHz-wide) DWDM channel, and the corresponding small wavelength difference is nearly linear and well known.

BRIEF DESCRIPTION OF THE DRAWINGS

Further features and exemplary advantages of the present invention will become apparent to the skilled person from the following detailed description, taken in conjunction with the appended drawings, in which:

FIG. 3 comprises FIG. 3A, FIG. 3B, FIG. 3C and FIG. 3D, wherein FIGS. 3A and 3B are graphs showing optical spectrum traces of a 40G signal as would be acquired respectively at Tap 1 and Tap 5 of the network of FIG. 2, and wherein

It will be noted that throughout the appended drawings, like features are identified by like reference numerals.

DETAILED DESCRIPTION

Figure 1:
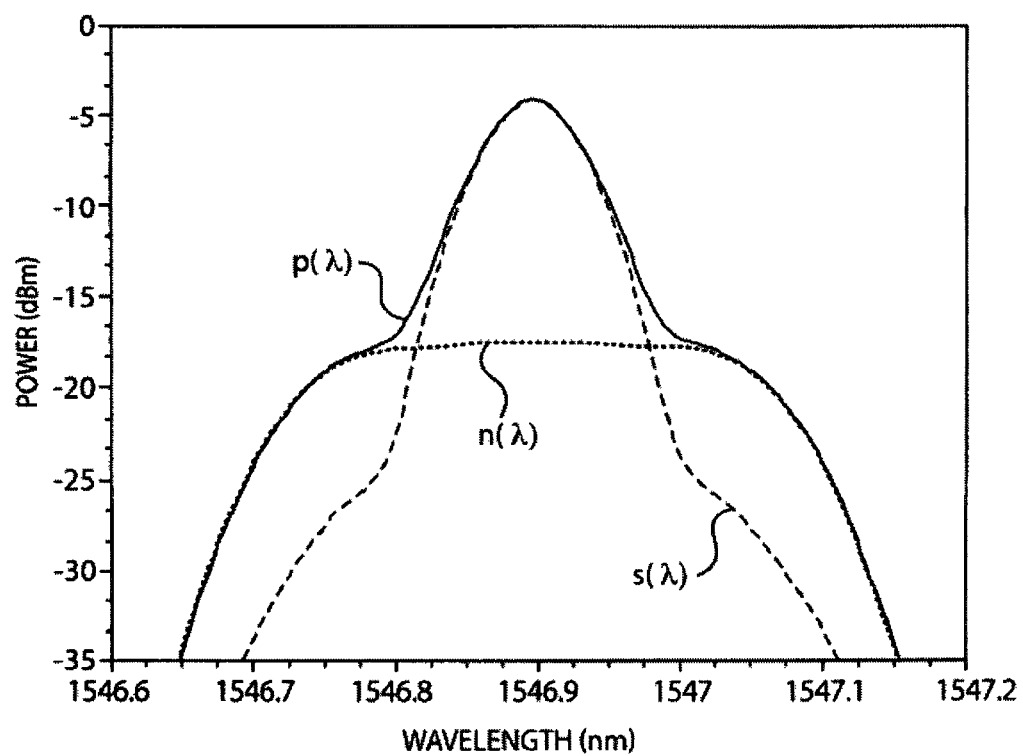
FIG. 1 is a graph illustrating the optical spectrum of an exemplary optical signal-under-test along with the optical spectrum of its noise contribution and of its signal contribution.

Now referring to FIG. 1, the methods and systems described herein relate to the characterization of an optical Signal-Under-Test (SUT) p which is used in optical telecommunications to transmit data over a Dense Wavelength Division Multiplexing (DWDM) optical channel. Throughout the present description, the optical signal p corresponds to one of the DWDM optical channels. Within the optical channel bandwidth of interest, the optical signal p includes two components, namely a signal contribution s arising from the data-carrying signal, and an ASE-noise contribution n which includes all other sources of optical power within the optical channel. In the case of polarization-multiplexed communication, the signal contribution includes two distinct components having mutually orthogonal states of polarization. The noise contribution n arises mostly from the Amplified Spontaneous Emission (ASE) noise of the optical amplifiers in the optical transmission system. FIG. 1 shows the optical spectrum $p(\lambda)$ of an exemplary optical signal p, along with the optical spectrum of its signal contribution $s(\lambda)$ and the optical spectrum of its noise contribution $n(\lambda)$, such that:

$$p(\lambda)=s(\lambda)+n(\lambda) \qquad (1.1)$$

An optical spectrum trace of the optical signal p can be acquired by an Optical Spectrum Analyzer (OSA) and represents the input optical signal p convolved with the filter spectral response of the OSA $h_{OSA}(\lambda)$. The optical spectrum trace $P(\lambda)$ thus represents the spectrally-resolved optical power of the optical signal p. The optical spectrum trace $P(\lambda)$ also includes a signal contribution $S(\lambda)$ and a noise contribution $N(\lambda)$, which are merged together and appear as the optical spectrum trace $P(\lambda)$.

The methods and systems described herein are used to discriminate the signal contribution $S(\lambda)$ from the noise contribution $N(\lambda)$ in the optical spectrum trace $P(\lambda)$ of the SUT in order to estimate spectral deformations of the signal contribution $s(\lambda)$ of the SUT occurred during transmission and evaluate quality parameters of the SUT. The instrumental noise associated with the detection system itself, namely the OSA, on the acquired optical spectrum trace $P(\lambda)$ is considered to have a negligible effect on the optical parameters to be characterized.

FIG. 1 illustrates a single DWDM channel, but it should be noted that when wavelength division multiplexing is employed, multiple DWDM channels (not shown) appear on the optical communication spectrum. It should thus be kept in mind that other optical signals are typically present, distributed spectrally on both sides of the optical signal p. Also, in the case of polarization-multiplexed networks, each DWDM channel includes orthogonally polarized signals which, on an optical spectrum trace $P(\lambda)$ acquired by an OSA, will appear combined and undistinguishable as a single unpolarized signal.

The methods described herein are predicated upon knowledge of the spectral shape of a signal where it is not subject to noise or spectral deformation (as provided by a reference optical spectrum trace) and upon the assumption that ASE noise (denoted $N_{ASE}(\lambda)$) is substantially uniform over a given region within the optical signal bandwidth. From this knowledge, it is possible to estimate the spectral deformation of the signal contribution $S(\lambda)$ of the SUT compared to the reference optical spectrum trace. For example, the reference optical spectrum trace may be obtained using a reference signal that is not subjected to spectral deformations and furthermore that is either not subjected to noise or that comprises a known ASE noise level (allowing it to be mathematically removed). These methods also enable mathematical discrimination of the ASE-noise contribution $N_{ASE}(\lambda)$ from the signal contribution $S(\lambda)$ in that given region. One or more quality parameters characterizing the polarization-multiplexed SUT, such as the signal-deformation-only Optical Signal-to-Noise Ratio ($OSNR_{SD}$), the ASE-only Optical Signal-to-Noise Ratio ($OSNR_{ASE}$) or the Signal Deformation Factor (SDF) (defined hereinbelow), may be determined once the spectral deformation of the signal contribution and, optionally, the ASE-noise contribution, have been estimated.

It is noted that the reference signal need not be absolutely free of any spectral deformation. In fact, if the reference signal also suffers from a certain degree of NLE-induced deformation for example, the spectral deformation of the SUT as compared to the reference signal may be estimated. If the initial spectral deformation of the reference signal is known, it can be taken into account in the estimation of the overall spectral deformation of the SUT.

Figure 2:
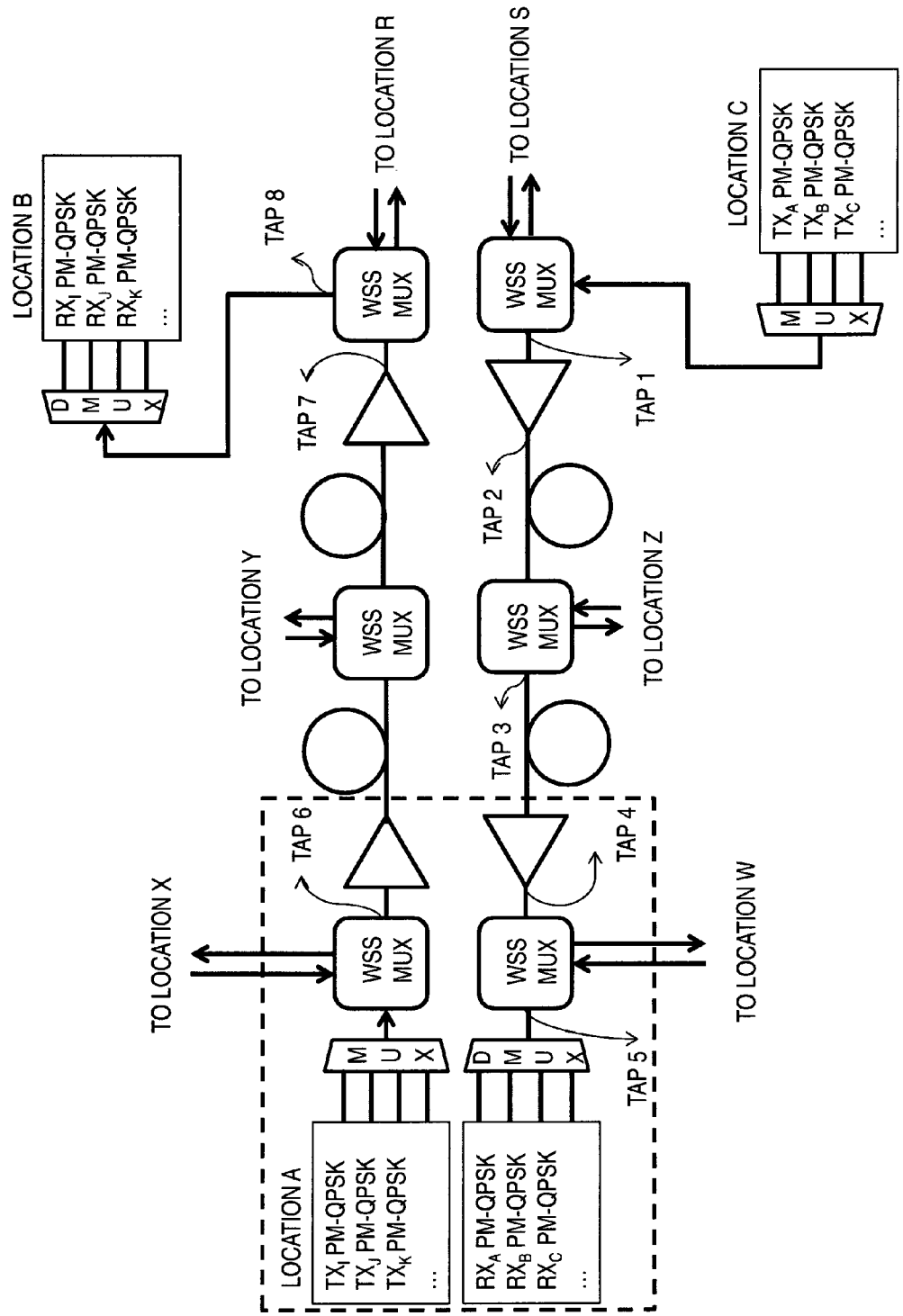
FIG. 2 is a schematic illustrating an example generic network scheme wherein an optical signal-under-test may be characterized using the methods described herein.

FIG. 2 shows an example of a generic network scheme wherein an optical SUT may be characterized using the methods described herein. The network scheme of FIG. 2 is shown for illustrative purposes only of applications of the methods described hereinbelow. It should be understood that such methods may also be applicable to other network schemes or in unrelated contexts. The illustrative network of FIG. 2 employs a 40G Polarization-Multiplexed Quadrature Phase-Shift Keying (PM-QPSK) modulation scheme and comprises a plurality of PM-QPSK transmitters 10, 12 and PM-QPSK receivers 14, 16 connected together through the network in order to transmit data between a plurality of nodes disposed at a plurality of distinct locations A, B, C, R, S, W, X, Y, Z. The network, shown in FIG. 2, includes a first optical communication link 100 between transmitter 10 at location C and receiver 14 at location A, and a second optical communication link 200 between transmitter 12 at location A and receiver 16 at location B. Communication link 100 comprises optical fibers 110, 112, a plurality of multiplexers and demultiplexers such as Wavelength Selective Switch Multiplexers (WSS Mux) 114, 116, 118 and a plurality of optical amplifiers 120, 122 distributed along the communication link. Similarly, communication link 200 comprises optical fibers 210, 212, a plurality of multiplexers and demultiplexers such as WSS Mux 214, 216, 218 and a plurality of optical amplifiers 220, 222 distributed along the communication link. Monitoring tap ports (e.g. the 5% port of a 95/5 splitter), which are commonly available on network systems, are disposed along communication link 100 (Tap 1, Tap 2, Tap 3, Tap 4, Tap 5) and along communication link 200 (Tap 6, Tap 7, Tap 8) to monitor the optical signals as they propagate along the communication link, using the methods described herein.

The methods described herein provide for the determination of quality parameters characterizing a SUT taken anywhere along the communication links 100 and 200, using a reference signal. The SUT to be characterized may be the optical signal as may be acquired at Tap 2, Tap 3, Tap 4, Tap 5, Tap 7 or Tap 8, for example.

The optical spectrum trace of the SUT is generally obtained with a measurement instrument capable of discriminating optical frequencies encompassed within the optical bandwidth of the SUT. Such measurements are typically acquired using a standard grating-based OSA such as, for example, that described in U.S. Pat. No. 6,636,306 to He et al. commonly owned by the Applicant, or that commercially available as the FTB-5240 series of OSAs manufactured and sold by EXFO Inc. Alternatively, the methods described herein may also be implemented from measurements acquired by a heterodyne OSA or a Fourier Transform OSA (FFT OSA) for instance, or any other suitable means for obtaining the optical spectra.

Figure 3A:
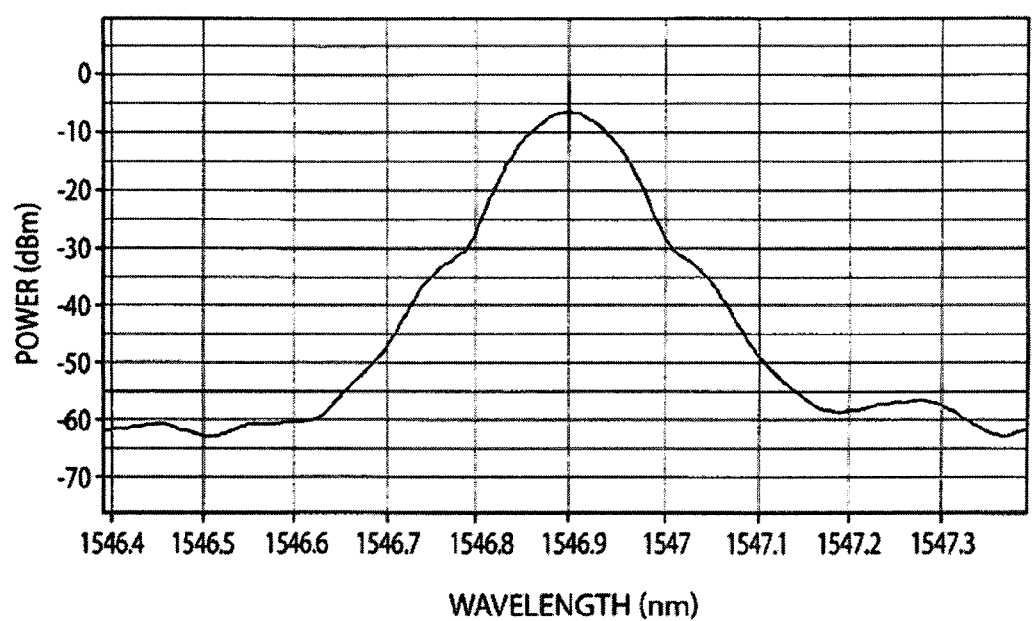
Figure 3B:
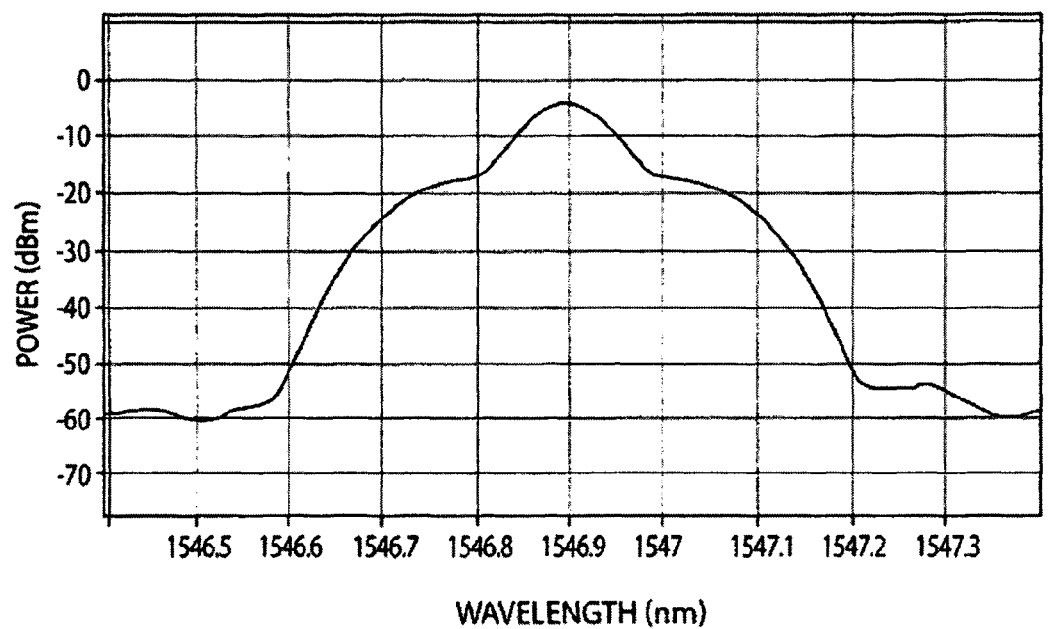
Figure 3C:
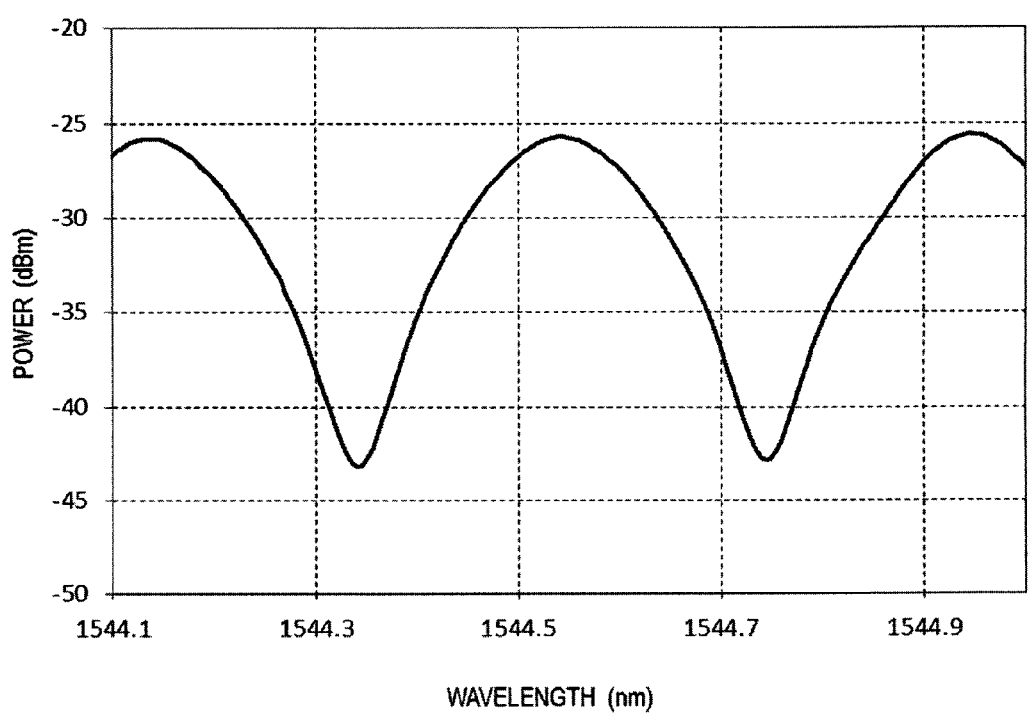
FIGS. 3C and 3D are graphs showing optical spectrum traces of a 100G signal as would be acquired respectively at Tap 1 and Tap 5 of the network of FIG. 2.
Figure 3D:
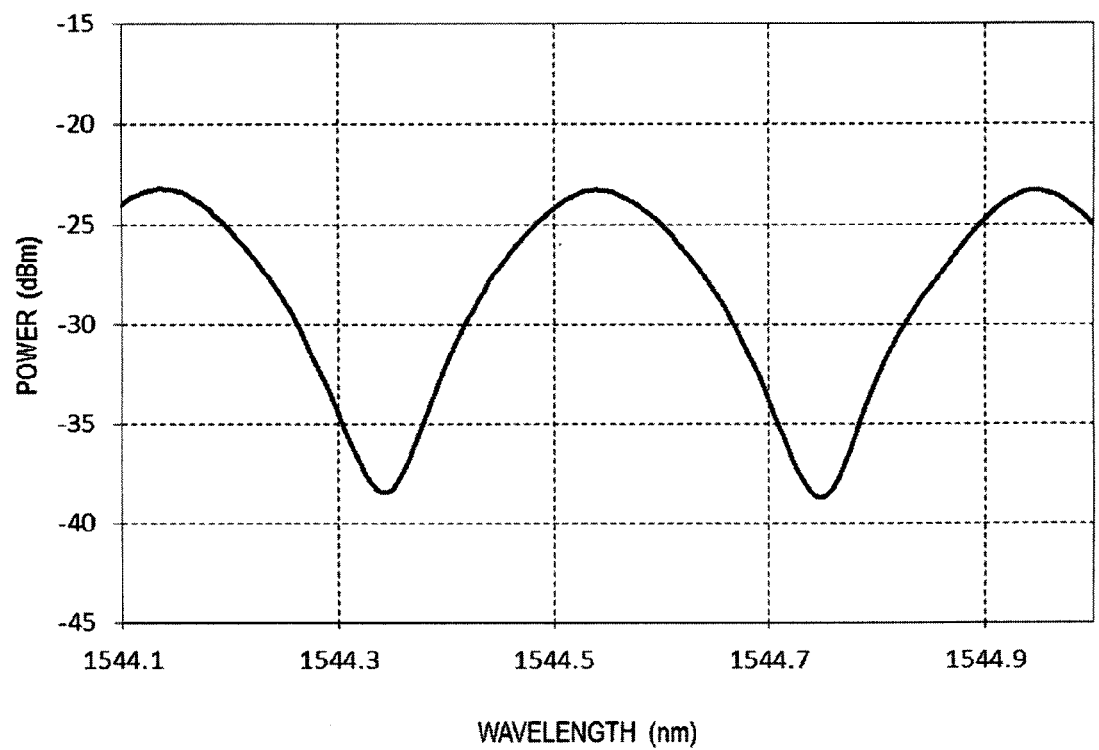

FIGS. 3A and 3B show optical spectrum traces of a 40G signal as would be acquired respectively on Tap 1 and Tap 5, and FIGS. 3C and 3D show optical spectrum traces of a 100G signal as would be acquired respectively on Tap 1 and Tap 5.

In one application, the signal to be characterized is the one appearing at Tap 5 for example. An optical spectrum trace of the SUT is obtained using the OSA connected at Tap 5 (the test point) and the reference signal is taken at an "upstream" Tap 1 (the reference point), such that the test and reference points are on the same communication link. In this case, the reference signal and the SUT originate from the same transmitter 10 and the reference signal can be assumed to be free of ASE noise considering that the signal at Tap 1 has not passed through any optical amplifier. In order to acquire the optical spectrum trace of the reference signal, a technician would generally have to physically go to two different locations on the network, i.e. Location A and Location C, while carrying a portable test instrument, i.e. an optical spectrum analyzer, to acquire optical spectrum traces of the SUT and the reference signal.

The signal contribution of such a reference signal corresponds to the signal contribution of the SUT before having been subjected to spectral deformations, in the spectral region of interest. Within the optical signal bandwidth, the spectral shape of the signal propagating in the communication link may be slightly transformed due to non-linear effects, for example. The methods described hereinbelow enable the estimation, within a given spectral range, of the spectral deformation of the signal contribution of the SUT compared to the reference signal. In this context, the spectral deformations are generally due to non-linear effects. Also, the spectral shape of the signal may change along the communication link due to filtering caused by multiplexing and demultiplexing devices. However, such deformations will typically be negligible across a portion of the optical signal bandwidth that is sufficient for the application of the herein described methods.

Signals appearing at Tap 3, Tap 4 or Tap 5 may also be characterized similarly using the signal at Tap 1 as the reference signal.

If the $OSNR_{ASE}$ were to be known anywhere else on communication link 100, such as on Tap 2 or Tap 3 for example, a reference signal might then be taken at that reference point instead. It is noted that, as long as it is known, the $OSNR_{ASE}$ of the reference signal does not need to be higher than the $OSNR_{ASE}$ of the SUT to be characterized. Furthermore, if the $OSNR_{ASE}$ of the reference signal is not known, the ASE noise deduced from the method will correspond to the differential ASE noise between the SUT and the reference signal. In some applications, this differential ASE noise may also represent a valuable (relative) quality parameter of the SUT (indicative of the degradation of the transmission signal from the reference point to the SUT measurement point).

Also, if the signal acquired on Tap 2 or Tap 3 already shows some initial spectral deformation (mainly due to NLEs) compared to the signal at the transmitter, and if this initial spectral deformation is known, this signal may itself serve as the reference signal. The spectral deformation calculated using this alternative reference signal (of known deformation) will correspond to the relative spectral deformation between the SUT and the alternative reference signal which, in some applications, may represent a further useful (relative) quality parameter of the SUT (indicative of the degradation of the transmission signal from the reference point to the SUT measurement point). The initial spectral deformation may also be combined with the estimated spectral deformation of the SUT as compared to this alternative reference signal, to provide an overall spectral deformation. In this case, the overall spectral deformation may be used to calculate a quality parameter (e.g. the $OSNR_{SD}$) characterizing the spectral deformation of the signal contribution of the SUT.

In a similar manner, in another application, the reference signal may be obtained at the same point where the SUT is to be characterized but at a different time. For example, the reference signal may be acquired at Tap 5 at commissioning characterization, when the ASE-noise level was known, and be used at a later time to characterize changes in spectral deformation and ASE level that could have occurred after commissioning. The spectral deformation then obtained corresponds to the relative spectral deformation between the SUT at measurement time and the reference SUT at commissioning which, in monitoring and maintenance applications, may represent a further useful quality parameter of the SUT.

In yet another application, the SUT to be characterized is the signal as measured at Tap 4 or Tap 5 on communication link 100. The technician therefore goes to location A to acquire an optical spectrum trace of the SUT at Tap 4 or Tap 5. One should note that the signal appearing on Tap 6 of communication link 200, which is generated using optical transmitter 12 of the same type as optical transmitter 10, may have a signal contribution that is representative of the signal contribution of the signal at Tap 1, i.e. before having been subjected to spectral deformation, and has a noise contribution which may be assumed negligible in this case. This signal may therefore be used as a reference signal. In this manner, the optical spectrum traces of the SUT and of the reference signal may be both obtained at the same location, e.g., location A, which eliminates the need for having the technician to travel to a different location to acquire a reference trace. It is noted that in this case, the reference signal and the SUT are not necessarily in the same DWDM optical channel. In this case, the reference optical spectrum trace may be obtained by numerically processing the acquired trace of the reference signal to transpose it in wavelength from the channel wavelength of the reference signal to that of the SUT and applying a scale factor it to take into account any difference in symbol rate and/or overhead if necessary. The processing may involve a translation as well as a scale transformation in the frequency domain followed by a resampling on the resolution grid of the optical spectrum analyzer that is used for the optical spectrum acquisition of the SUT.

As mentioned hereinabove, it is very important that the reference trace be representative of the signal contribution of the SUT before being affected by NLE-induced spectral deformation over the given spectral range of interest, in order to allow discrimination between ASE-noise and spectral deformation.

It should be appreciated that, if the spectral distribution of the signal contribution of the SUT at the transmitter is a priori known or can be reliably assumed, actual measurement of the reference via the tap couplers is not necessarily required. The reference optical spectrum trace may then consist of a generic optical spectrum trace, which is representative of the signal contribution of the SUT that has not been subjected to spectral deformations. The generic trace may be obtained by acquiring, using the OSA, an optical spectrum trace of a standard transmitter that is generically representative of the transmitters 10, 12 present in the network-under-test. The generic trace may also be synthesized numerically based on a simulated or experimentally-obtained spectral function of a generic transceiver that is numerically convoluted with the spectral response of the measurement instrument, e.g. the filter spectral response of the OSA $h_{OSA}(\lambda)$, used to acquire the optical spectrum trace of the SUT. It is noted that only a relative power spectral response of the reference is needed. Again, in this case, the reference trace must be very representative of the (non-deformed) SUT over the given spectral range of interest, in order to allow discrimination of ASE-noise and spectral deformation on the SUT.

Figure 4:
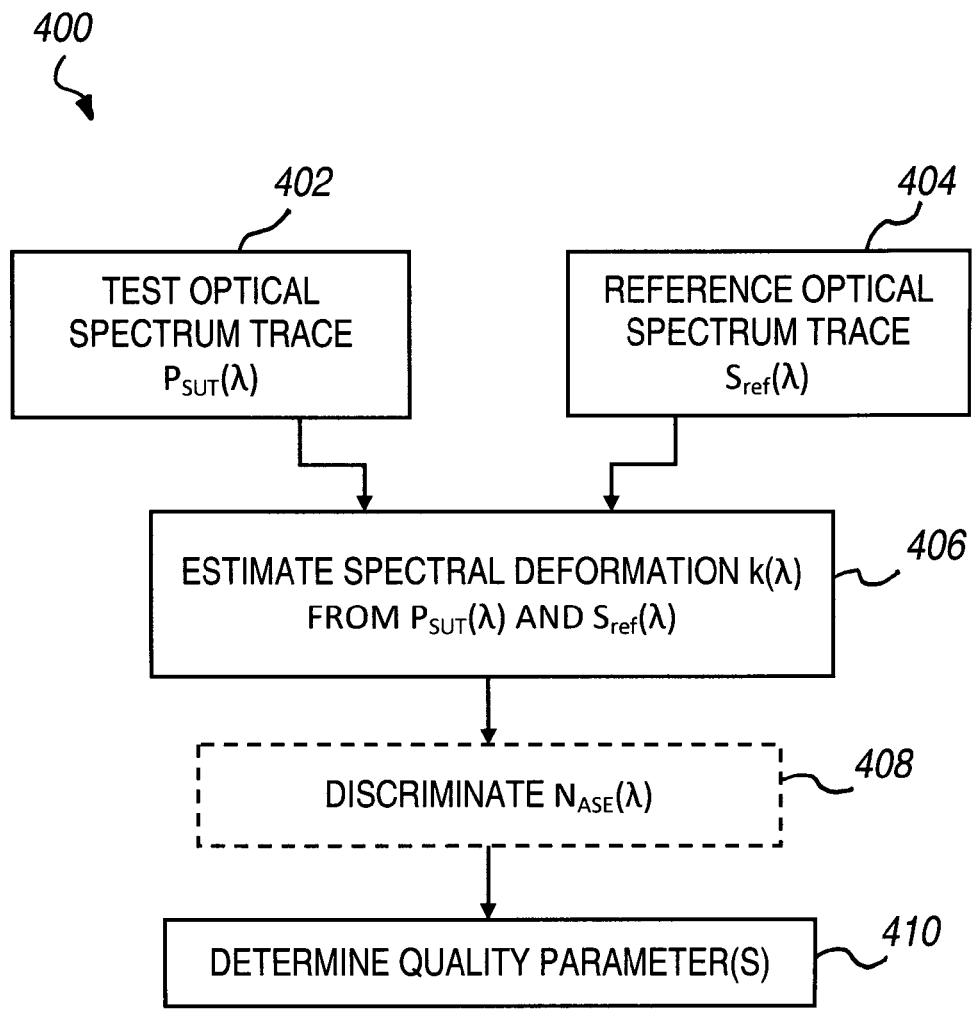
FIG. 4 is a flowchart illustrating a method for determining a quality parameter characterizing a polarization-multiplexed signal-under-test.

FIG. 4 illustrates a method 400 for determining a quality parameter characterizing a polarization-multiplexed optical SUT. The method of FIG. 4 may be used as explained hereinabove for characterizing optical signals in an optical network, such as the generic network scheme of FIG. 2 using a reference optical spectrum trace. It would however be understood that the method of FIG. 4 is not limited to the configuration of FIG. 2 and that it could be applied to any polarization-multiplexed optical communication signal, irrespective of the network scheme. For example, it would also be applicable to point-to-point networks, to point-to-multipoint networks or to "all-to-all" networks employing any polarization-multiplexed modulation scheme, such as Polarization-Multiplexed Quadrature Phase-Shift Keying (PM-QPSK), including Dual-polarization QPSK and Polarization-Switching QPSK, with a data transmission rate of 40 Gb/s, 100 Gb/s or any other. It will be understood that the method of FIG. 4 could also be applied to signals employing any other polarization-multiplexed modulation schemes such as Polarization-Multiplexed Differential Quadrature Phase Shift Keying (PM-DQPSK) or Polarization-Multiplexed Quadrature Amplitude Modulation (PM-QAM) for example provided that the spectral power variation of the ASE-noise contribution is negligible compared to that of the signal contribution, i.e. $\Delta N_{ASE}(\lambda) \ll \Delta S(\lambda)$, within a given spectral range that is used for processing.

In step 402, a test optical spectrum trace $P_{SUT}(\lambda)$ of the SUT to be characterized is obtained, for instance, through an acquisition performed using an OSA. Optical spectrum trace $P_{SUT}(\lambda)$ may be acquired at any test point along an optical communication link. As mentioned above, trace $P(\lambda)$ is typically acquired at a monitoring tap port corresponding to the position on the network where the SUT is to be characterized. For example, trace $P(\lambda)$ may be acquired at Tap 2, Tap 3, Tap 4 or Tap 5 of the network of FIG. 2. It is noted that in order to determine quality parameters of the SUT, a relative spectral power distribution of the SUT is sufficient. There is therefore no need for trace $P_{SUT}(\lambda)$ to be referenced in absolute value. Trace $P_{SUT}(\lambda)$ comprises a data-carrying signal contribution $S(\lambda)$ comprising polarization-multiplexed signals, and a ASE-noise contribution $N_{ASE}(\lambda)$ within the optical signal bandwidth of the SUT such that:

$$P_{SUT}(\lambda)=S(\lambda)+N_{ASE}(\lambda). \quad (4.1)$$

In step 404, a reference optical spectrum trace $S_{ref}(\lambda)$ is obtained. The reference optical spectrum trace $S_{ref}(\lambda)$ may be obtained as explained hereinabove from an optical spectrum acquisition of a reference signal or may correspond to a generic reference signal obtained numerically based on a simulated or experimentally-obtained spectral function of a generic transceiver that is numerically convolved with the filter spectral response of the OSA $h_{OSA}(\lambda)$ to obtain the reference optical spectrum trace.

As mentioned above, the reference trace $S_{ref}(\lambda)$ may be acquired, for example, at Tap 1 of the network of FIG. 2. In this specific case, the ASE noise may be considered negligible and an acquisition of an optical spectrum trace of the reference signal may be used at the reference optical spectrum trace. If the reference trace $S_{ref}(\lambda)$ is acquired at Tap 6 for example, the ASE noise may also be considered negligible. As explained above, the reference trace $S_{ref}(\lambda)$ may also be acquired at a position along a communication link where the ASE noise level is not negligible but is either theoretically known or has been previously characterized, i.e. the ASE noise level or the $OSNR_{ASE}$ is at least approximately known over the optical signal bandwidth. In this case, an ASE-free reference optical spectrum trace may be calculated from the acquired optical spectrum trace of the reference signal and the estimated ASE noise level or $OSNR_{ASE}$ of the reference signal. Accordingly, it will therefore be understood that, in this case, the reference optical spectrum trace $S_{ref}(\lambda)$ is ideally relatively free of ASE noise. However, the acquired optical spectrum trace of the reference signal (from which the reference optical spectrum trace $S_{ref}(\lambda)$ is obtained) does not need to be. Of course, any residual ASE noise on the reference optical spectrum trace will not preclude the use of method 400 but may introduce an error in the determined quality parameters. The ASE noise in the reference optical spectrum trace will typically be considered negligible when the $OSNR_{ASE}$ of the reference signal is significantly higher than that of the SUT. The presence of ASE noise in the reference optical spectrum trace will simply result in an error on determined quality parameters. The level of acceptable ASE noise in the reference optical spectrum trace hence depends on the level of acceptable error on the quality parameters to be determined. For example, there will be a 0.5-dB systematic overestimation of the $OSNR_{ASE}$ of the SUT if one assumes that there is negligible noise contribution on a reference signal having in fact an $OSNR_{ASE}$ that is 10 dB higher than that of the SUT.

Furthermore, a non-negligible ASE noise on the reference optical spectrum trace $S_{ref}(\lambda)$ (even if not known) will also not preclude the use of method 400. In this case, the method will result in the calculation of a differential noise level between the SUT and the reference optical spectrum trace which may well represent a valuable (relative) quality parameter of the SUT.

Also, the reference signal may be at a channel wavelength different from that of the SUT. In this case, since only relative spectral information is needed for performing the methods described herein, the optical spectrum trace of the reference signal as acquired may be transposed in wavelength to the DWDM optical channel of the SUT before being used as a reference trace Since only relative spectral information is required for performing the methods described herein, a wavelength or frequency offset may easily be applied on the reference trace (at step 406 of the method of FIG. 4) to correct for the channel wavelength mismatch.

It will be understood that other reference signals and traces $S_{ref}(\lambda)$ not specifically described herein may also be used.

It will be understood that although optical spectrum traces acquired by conventional OSAs typically cover a spectral range significantly larger than that of the optical signal bandwidth of an SUT, this is not required for the method 400 to be applicable. As a generalization, in principle only two spectral points are required to apply the method 400 but it should be noted that the method will generally be improved if the test optical spectrum trace corresponds to a spectral range encompassing a substantial portion of said optical signal bandwidth.

In step 406, the spectral deformation of the signal contribution $S(\lambda)$ of the SUT as compared to the reference trace $S_{ref}(\lambda)$ is estimated within a spectral range encompassing at least a portion of the optical signal bandwidth. As will be detailed hereinbelow, the spectral deformation may be estimated using the test optical spectrum trace $P_{SUT}(\lambda)$ of the SUT and the reference trace $S_{ref}(\lambda)$. Estimation of the spectral deformation uses properties of the signal contribution and of the ASE-noise contribution to discriminate the two on the test optical spectrum trace $P(\lambda)$, by assuming that the ASE-noise contribution is generally uniform over a given spectral range used for the processing, or more precisely, that the ASE-noise contribution variation is negligible compared to the signal contribution variation, i.e. $\Delta N_{ASE}(\lambda) \ll \Delta S(\lambda)$, within the given spectral range. It should be noted that the spectral range where this assumption holds will typically correspond to the spectral region where filtering caused by multiplexing and demultiplexing is negligible.

Then, in presence of spectral deformations on the signal contribution $S(\lambda)$ of the SUT (induced by non-linear effects) as compared to the reference trace $S_{ref}(\lambda)$, the optical power of the SUT will be given by:

$$P_{SUT}(\lambda)=S(\lambda)+N_{ASE}(\lambda) \quad (4.2)$$

$$P_{SUT}(\lambda)=k(\lambda) \cdot S_{ref}(\lambda)+N_{ASE}(\lambda) \quad (4.3)$$

where $k(\lambda)$ is the signal deformation function, defined as a ratio of the signal contribution $S(\lambda)$ of the SUT with respect to the reference trace $S_{ref}(\lambda)$:

$$k(\lambda)=S(\lambda)/S_{ref}(\lambda) \qquad (4.4)$$

and represents the spectral deformation of the signal contribution $S(\lambda)$ of the SUT as compared to the reference trace $S_{ref}(\lambda)$. It is noted that in practice, neither the signal deformation function $k(\lambda)$ nor the ASE-noise contribution $N_{ASE}(\lambda)$ are a priori known.

Now, assuming that the ASE-noise contribution $N_{ASE}(\lambda)$ is substantially constant (i.e. $\Delta N_{ASE}(\lambda) \ll \Delta S(\lambda)$) over a given spectral range, a comparison of the derivative as a function of wavelength of the test trace $P_{SUT}(\lambda)$ and the reference trace $S_{ref}(\lambda)$ enables the ASE-noise contribution to be removed, e.g.:

$$Rdev(\lambda) = \frac{dP_{SUT}(\lambda)/d\lambda}{dS_{ref}(\lambda)/d\lambda} = k(\lambda) + \frac{dk(\lambda)}{d\lambda} \cdot \frac{S_{ref}(\lambda)}{dS_{ref}(\lambda)/d\lambda} \qquad (4.5)$$

Accordingly, if the term including the derivative of $k(\lambda)$ is neglected, the ratio $Rdev(\lambda)$ provides a first estimation of the signal deformation function $k(\lambda)$ that is indicative of the spectral deformation of the signal contribution.

As will be detailed hereinbelow with reference to FIG. 5, equation (4.5) can be further solved for the signal deformation function $k(\lambda)$ by posing some assumptions.

It is noted that, although the spectral deformation to be estimated is herein expressed as the signal deformation function $k(\lambda)$, other functions or parameters could serve to represent the spectral deformation. For example, a normalized version of the signal deformation function $k(\lambda)$ could be used. The spectral deformation could also be expressed as a spectral deformation parameter defined, for instance, as the standard deviation of the normalized signal deformation function $k(\lambda)$ or it could also take the form of a narrowing/broadening value for example.

In step 408, which is optional, the ASE-noise contribution $N_{ASE}(\lambda)$ and the signal contribution $S(\lambda)$ are mutually discriminated in the test trace $P_{SUT}(\lambda)$, over a given spectral range, using the reference trace $S_{ref}(\lambda)$ and the test trace $P_{SUT}(\lambda)$.

For example, as will be described in more details hereinbelow, if the spectral deformation is estimated—as given by the signal deformation function $k(\lambda)$ in this case—at at least at one point, within a given spectral range where the ASE-noise contribution $N_{ASE}(\lambda)$ is assumed constant (i.e. $\Delta N_{ASE}(\lambda) \ll \Delta S(\lambda)$), it is possible to calculate the ASE-noise contribution $N_{ASE}(\lambda)$ using the relation:

$$N_{ASE}(\lambda)=P_{SUT}(\lambda)-k(\lambda) \cdot S_{ref}(\lambda) \qquad (4.6)$$

Other ways of deriving the ASE-noise contribution $N_{ASE}(\lambda)$ from the reference trace $S_{ref}(\lambda)$ and the test trace $P_{SUT}(\lambda)$ are described hereinbelow.

In step 410, one or more quality parameters characterizing the SUT are determined, directly or indirectly, from the estimated spectral deformation. The quality parameters may take the form of the ASE-only OSNR ($OSNR_{ASE}$), the signal-deformation OSNR ($OSNR_{SD}$), the Signal Deformation Factor (SDF), or any other parameter that may be used to characterize the spectral deformation or other impairments of the SUT, e.g. ASE noise.

The thereby-determined quality parameter(s) are output for use, for example, in monitoring, maintenance or troubleshooting of a DWDM optical system. For example, the quality parameter(s) may be output by graphical display, by printing, by generating an electrical signal or by storing it in memory for later retrieval. Other parameters can also be displayed or otherwise output in a graphical or numerical form.

Figure 5:
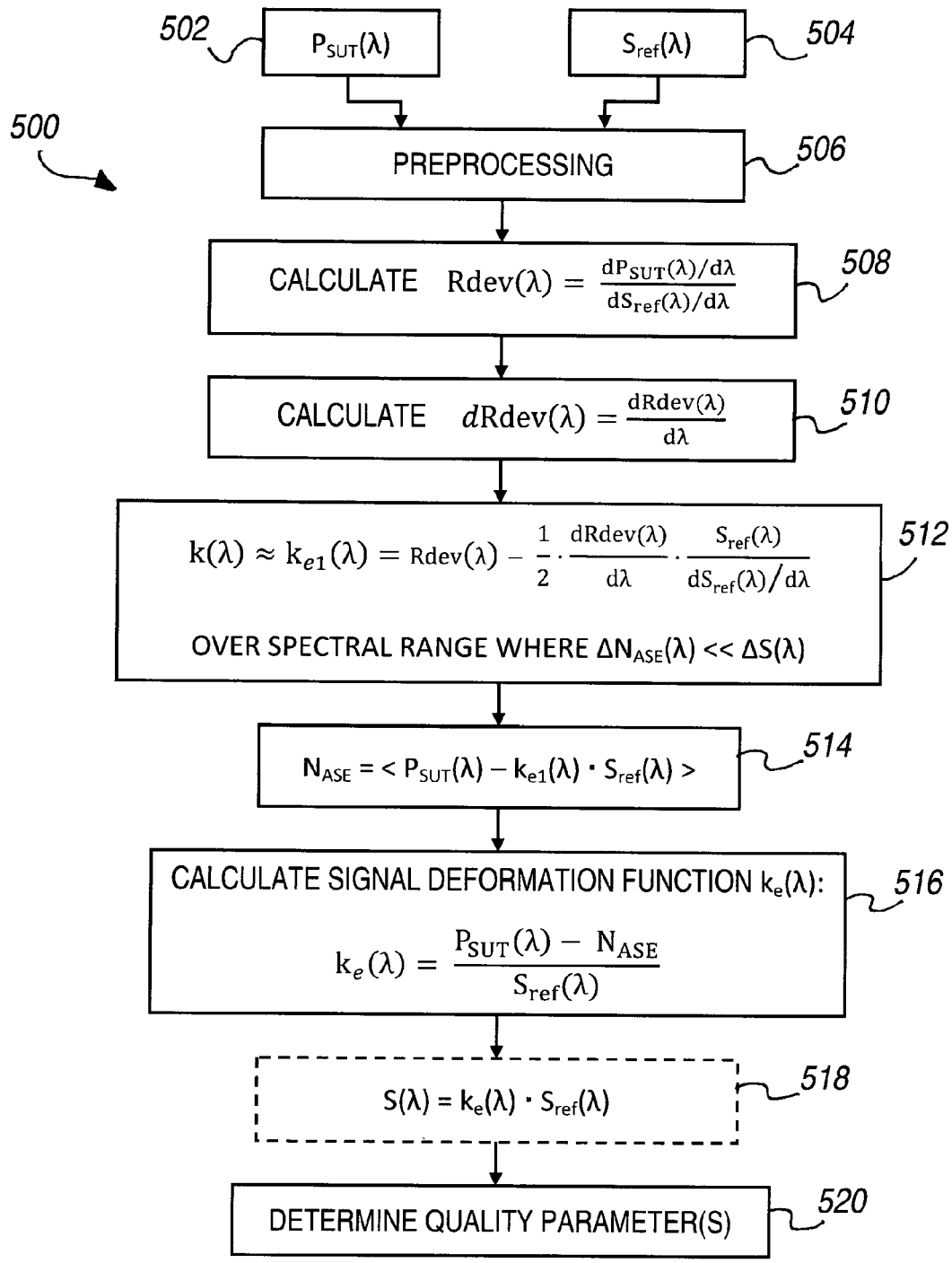
FIG. 5 is a flowchart illustrating a method for determining a quality parameter characterizing a polarization-multiplexed signal-under-test, in accordance with a first embodiment.

FIG. 5 illustrates a first embodiment of the method 400 described hereinabove for determining a quality parameter characterizing a polarization-multiplexed SUT. The method 500 of FIG. 5 gives one specific implementation algorithm of how the test trace $P_{SUT}(\lambda)$ and the reference trace $S_{ref}(\lambda)$ may be processed to estimate the spectral deformation $k(\lambda)$ of the signal contribution of the SUT as compared to the reference trace. The method 500 of FIG. 5 is illustrated here for the specific case of 100G PM-QPSK signals.

The method 500 of FIG. 5 is based on the following approach which uses the ratio $Rdev(\lambda)$ of the derivative of the test optical spectrum trace as a function of wavelength with respect to the derivative of the reference optical spectrum trace as a function of wavelength. Knowing that $$Rdev(\lambda) = \frac{dP_{SUT}(\lambda)/d\lambda}{dS_{ref}(\lambda)/d\lambda} = k(\lambda) + \frac{dk(\lambda)}{d\lambda} \cdot \frac{S_{ref}(\lambda)}{dS_{ref}(\lambda)/d\lambda} \qquad (5.1)$$

By deriving $Rdev(\lambda)$ and neglecting the term including the second derivative of $k(\lambda)$, we obtain:

$$\frac{dRdev(\lambda)}{d\lambda} \approx \frac{dk(\lambda)}{d\lambda} \cdot \left(2 - \frac{d^2 S_{ref}(\lambda)}{d^2 \lambda} \cdot \frac{S_{ref}(\lambda)}{dS_{ref}(\lambda)/d\lambda}\right) \qquad (5.2)$$

which yields:

$$\frac{dk(\lambda)}{d\lambda} \approx \frac{dRdev(\lambda)/d\lambda}{\left(2 - \frac{d^2 S_{ref}(\lambda)}{d^2 \lambda} \cdot \frac{S_{ref}(\lambda)}{dS_{ref}(\lambda)/d\lambda}\right)} \qquad (5.3)$$

If the term including the second derivative of $S_{ref}(\lambda)$ is also neglected, the expression for $k(\lambda)$ may be further simplified:

$$k(\lambda) \approx Rdev(\lambda) - \frac{1}{2} \cdot \frac{dRdev(\lambda)}{d\lambda} \cdot \frac{S_{ref}(\lambda)}{dS_{ref}(\lambda)/d\lambda} \qquad (5.4)$$

It is noted that, on account of the assumptions made to derive the above estimation of $k(\lambda)$, it is valid only in the spectral range of the SUT where the wavelength-dependent variation of the ASE-noise contribution is negligible compared to the corresponding variation of the signal contribution. This assumption typically holds in a spectral region where spectral deformation caused by multiplexing and demultiplexing is negligible, but is generally not valid close to the peak of the SUT, i.e. where the variation of the signal contribution is small. In the case of typical 100G PM-QPSK signals, it is found that this estimation of $k(\lambda)$ typically holds at least in a spectral region corresponding to an offset of 5 GHz to 10 GHz from the peak wavelength.

Moreover, in the case of a tightly filtered test signal due to optical add/drop multiplexing and demultiplexing for example, the spectral region over which the assumption holds may be reduced. In practical applications, this can typically be overcome by selecting a narrower spectral region for the processing. Furthermore, over the overall channel bandwidth, the spectral deformation k(λ) may of course comprise a "filtering" component caused by multiplexing and demultiplexing in addition to non-linear effects. That being said, the methods described herein are still applicable.

It should also be understood that even though the term including the second derivative of $S_{ref}(\lambda)$ is neglected to derive equation (5.4) of k(λ), this term could also be preserved to give a different equation for k(λ) that would provide a result substantially equivalent to that of equation (5.4) and that could therefore be used equivalently in method 500.

In step 502, a test optical spectrum trace $P_{SUT}(\lambda)$ of the SUT to be characterized is obtained. This step is equivalent to step 402 of FIG. 4 and will result in a test trace $P_{SUT}(\lambda)$ comprising a data-carrying signal contribution S(λ) comprising polarization-multiplexed signals, and a ASE-noise contribution $N_{ASE}(\lambda)$ within the optical signal bandwidth of the SUT.

In step 504, a reference optical spectrum trace $S_{ref}(\lambda)$ is obtained. This step is equivalent to step 404 of FIG. 4.

In step 506, some signal preprocessing is applied to the optical spectrum traces $P_{SUT}(\lambda)$ and $S_{ref}(\lambda)$ as obtained from steps 502 and 504. For example, a smoothing function may be applied to traces $P_{SUT}(\lambda)$ and $S_{ref}(\lambda)$ to smooth any acquisition noise. This may be helpful especially in view of calculating the derivatives of traces $P_{SUT}(\lambda)$ and $S_{ref}(\lambda)$, a process that is very sensitive to high-frequency noise.

Other preprocessing may be necessary to mutually align traces $P_{SUT}(\lambda)$ and $S_{ref}(\lambda)$ in wavelength. This may be required for example if a generic reference trace is used or if the reference trace $S_{ref}(\lambda)$ and the test trace $P_{SUT}(\lambda)$ are acquired on different DWDM optical channels, as explained hereinabove. The preprocessing may then include a transposition in wavelength of the acquired optical spectrum trace of the reference signal to the DWDM optical channel of the SUT, before being used as a reference trace. Of course, both traces could be transposed to a third arbitrary wavelength as well. This transposition may be obtained by applying a translation in the optical wavelength or frequency domain. The wavelength (or frequency) shift may be calculated with various algorithms. For example, it may be found by aligning together the derivatives of traces $P_{SUT}(\lambda)$ and $S_{ref}(\lambda)$.

Of course, one skilled in the art will appreciate that other preprocessing may be used in addition to, or in combination with, the herein-mentioned preprocessing.

The spectral deformation of the signal contribution S(λ) of the SUT as compared to the reference trace $S_{ref}(\lambda)$ is estimated in steps 508, 510, 512, 514 and 516.

In step 508, a ratio Rdev(λ) of the derivative of the test trace $P_{SUT}(\lambda)$ as a function of wavelength with respect to the corresponding derivative of the reference trace $S_{ref}(\lambda)$ is calculated as follows:

$$Rdev(\lambda) = \frac{dP_{SUT}(\lambda)/d\lambda}{dS_{ref}(\lambda)/d\lambda} \quad (5.5)$$

In step 510, the derivative of the ratio Rdev(λ) as a function of wavelength is also calculated:

$$\frac{dRdev(\lambda)}{d\lambda} \quad (5.6)$$

In step 512, a first estimation $k_{e1}(\lambda)$ of the signal deformation function is calculated using equation (5.4), over a first spectral range $SR_1$ where the assumptions used to derive this equation are found to hold. As mentioned hereinabove, in the case of typical 100G PM-QPSK signals, it is found that this estimation of k(λ) holds in a spectral region corresponding to an offset of 5 GHz to 10 GHz from the peak wavelength.

In step 514, having calculated the signal deformation function $k_{e1}(\lambda)$ over this first spectral range $SR_1$, the ASE-noise contribution $N_{ASE}(\lambda)$ can be calculated over this same range as:

$$N_{ASE}(\lambda) = P_{SUT}(\lambda) - k_{e1}(\lambda) \cdot S_{ref}(\lambda) \quad (5.7)$$

Because the ASE noise is assumed to be substantially constant in wavelength, the estimated ASE noise level $N_{ASE}$ is calculated as the average of the resulting $N_{ASE}(\lambda)$ over the first spectral range:

$$N_{ASE} = \langle N_{ASE}(\lambda) \rangle \quad (5.8)$$

Knowing the ASE-noise level, the signal deformation function k(λ) may be calculated. In this respect, in step 516, the signal deformation function k(λ) is re-calculated over a second larger spectral range corresponding approximately to the optical signal bandwidth of the SUT or to a substantial portion thereof, e.g. in the case of a 100G PM-QPSK signal, a spectral range extending between −10G and +10G relative to the peak wavelength of the SUT, to provide an estimated signal deformation function $k_e(\lambda)$:

$$k_e(\lambda) = \frac{P_{SUT}(\lambda) - N_{ASE}}{S_{ref}(\lambda)} \quad (5.9)$$

The thereby calculated signal deformation function $k_e(\lambda)$ provides an estimation of the spectral deformation of the signal contribution of the SUT.

In step 518, the signal contribution S(λ) of the SUT may be calculated if required for the quality parameters to be evaluated. The signal contribution S(λ) may be calculated as:

$$S(\lambda) = k_e(\lambda) \cdot S_{ref}(\lambda) \quad (5.10)$$

In step 520, one or more quality parameters characterizing the SUT are determined from the calculated signal deformation function k(λ), the ASE-noise contribution $N_{ASE}$ and the signal contribution S(λ). Various quality parameters that may be determined are defined hereinbelow. It will be understood that the following quality parameters are examples only and that other quality parameters not defined herein could be determined as well and that the definition of the quality parameters specified could also vary.

Quality Parameters

An example of a quality parameter that can be determined is the ASE-only OSNR, which may be defined, in dB units, (normalized to be equivalent to that corresponding to a 0.1-nm resolution bandwidth) as follows:

$$OSNR_{ASE} = 10\log_{10}\left(\frac{\int_{CBW} S(\lambda) d\lambda}{\frac{0.1 \text{ nm}}{NBW} \int_{NBW} N_{ASE}(\lambda) d\lambda}\right) \quad (5.11)$$

where CBW is the channel bandwidth and NBW is the bandwidth over which the ASE-noise is to be evaluated.

Throughout this specification, the optical spectrum trace $P_{SUT}(\lambda)$ of the SUT has been conceptually separated into a signal contribution $S(\lambda)$ and an ASE-noise contribution $N_{ASE}(\lambda)$:

$$P_{SUT}(\lambda)=S(\lambda)+N_{ASE}(\lambda) \quad (5.12)$$

However, test trace $P_{SUT}(\lambda)$ may also be regarded as comprising three separate contributions, i.e. a non-deformed signal contribution $S_{refRx}(\lambda)$ which represents the reference trace $S_{ref}(\lambda)$ as transposed to the test point of the SUT, a spectral deformation noise contribution $N_{SD}(\lambda)$ and the ASE-noise contribution $N_{ASE}(\lambda)$:

$$P_{SUT}(\lambda)=S_{refRx}(\lambda)+N_{SD}(\lambda)+N_{ASE}(\lambda) \quad (5.13)$$

where $S_{refRx}(\lambda)$ is defined as:

$$S_{refRx}(\lambda)=k_0 \cdot S_{ref}(\lambda) \quad (5.14)$$

where $k_0$ may be defined as the value of $k(\lambda)$ at the signal peak, i.e. $k_0=k(\lambda_{pk})$ (of course, the value $k_0$ may be obtained by interpolation of $k(\lambda)$ at the signal peak $\lambda_{pk}$).

$N_{SD}(\lambda)$ is defined as:

$$N_{SD}(\lambda)=(k(\lambda)-k_0) \cdot S_{ref}(\lambda)=\Delta k(\lambda) \cdot S_{ref}(\lambda) \quad (5.15)$$

(where $N_{SD}$ is positive when the SUT has experienced NLE-induced broadening), and $N_{ASE}(\lambda)$ is the ASE-noise contribution $N_{ASE}(\lambda)$. Accordingly, we obtain:

$$S(\lambda)=S_{refRx}(\lambda)+N_{SD}(\lambda) \quad (5.16)$$

Then, another example of a quality parameter is the signal-deformation OSNR ($OSNR_{SD}$) (normalized to be equivalent to that corresponding to a 0.1-nm resolution bandwidth), which may be defined, in dB units, as:

$$OSNR_{SD} = 10\log_{10}\left(\frac{\int_{CBW} S_{refRx}(\lambda)\,d\lambda}{\frac{0.1 \text{ nm}}{NBW}\int_{NBW} N_{SD}(\lambda)\,d\lambda}\right) \quad (5.17)$$

where the bandwidth NBW may correspond to the channel bandwidth CBW for instance.

Yet another example of a quality parameter is a Signal Deformation Factor SDF that may be defined as:

$$SDF = \frac{\langle |k(\lambda)-k_0| \rangle}{k_0} \quad (5.18)$$

where brackets $\langle f(\lambda) \rangle$ stand for the average of function $f(\lambda)$ over a given spectral range and the brackets $|f(\lambda)|$ stands for the absolute value operation on $f(\lambda)$.

Alternatively, a different Signal Deformation Factor SDF' may be defined as the second-order coefficient of $k(\lambda)$:

$$k(\lambda)=k_0+a(\lambda-\lambda_{pk})+SDF'(\lambda-\lambda_{pk})^2 \quad (5.19)$$

which is obtained by fitting a second-order polynomial on the estimated signal deformation function $k_e(\lambda)$.

Yet another example of a quality parameter is an extended OSNR ($OSNR_E$) (normalized to be equivalent to that corresponding to a 0.1-nm resolution bandwidth), which takes into account both the ASE-noise contribution $N_{ASE}(\lambda)$ and the spectral deformation noise $N_{SD}(\lambda)$ and which may be defined as:

$$OSNR_E = 10\log_{10}\left(\frac{\int_{CBW} S(\lambda)\,d\lambda}{\frac{0.1 \text{ nm}}{NBW}\int_{NBW} N_E(\lambda)\,d\lambda}\right) \quad (5.20)$$

where $$N_E(\lambda) = N_{SD}(\lambda) + N_{ASE}(\lambda) \quad (5.21)$$

$$N_E(\lambda) = P_{SUT}(\lambda) - S_{refRx}(\lambda) \quad (5.22)$$

and where the bandwidth NBW may correspond to the channel bandwidth CBW for instance.

Some quality parameters could also be defined as functions of wavelength. For example, a Signal Deformation Factor function $SDF(\lambda)$ could be defined as:

$$SDF(\lambda) = \frac{k(\lambda)-k_0}{k_0} \quad (5.23)$$

Of course, other useful quality parameters may be determined as well.

Figure 6:
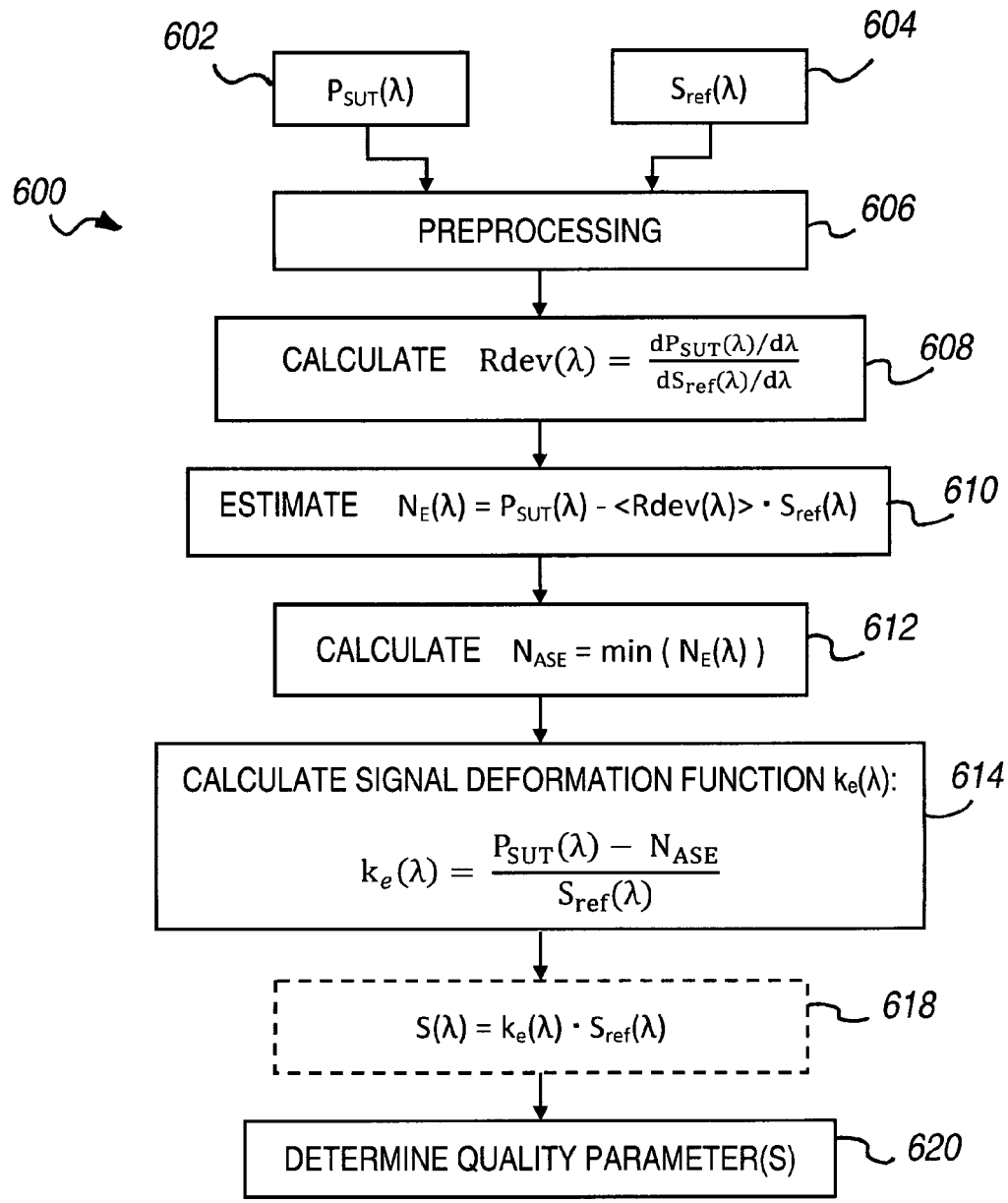
FIG. 6 is a flowchart illustrating a method for determining a quality parameter characterizing a polarization-multiplexed signal-under-test, in accordance with a second embodiment.

FIG. 6 illustrates a second embodiment of the method 400 described hereinabove for determining a quality parameter characterizing a polarization-multiplexed SUT. The method 600 of FIG. 6 gives another specific implementation algorithm for processing the test trace $P_{SUT}(\lambda)$ and the reference trace $S_{ref}(\lambda)$ in order to estimate the spectral deformation $k(\lambda)$ of the signal contribution of the SUT, via a comparison with the reference trace and/or the ASE-only noise comprised in the SUT.

In most cases, the spectral deformation of the SUT as it propagates along an optical communication link will be manifest as a spectral broadening of the optical signal. The specific method 600 of FIG. 6 is based on this premise.

The method 600 is also based on the use of the ratio $Rdev(\lambda)$ (equation (5.1)). However, instead of calculating the ASE-noise contribution $N_{ASE}$ from a first estimation $k_{e1}(\lambda)$ of the signal deformation function, method 600 first evaluates an extended noise contribution $N_E(\lambda)$, as defined hereinabove to be the sum of the ASE-noise contribution $N_{ASE}(\lambda)$ and the spectral deformation noise $N_{SD}(\lambda)$, i.e. $N_E(\lambda)=N_{SD}(\lambda)+N_{ASE}(\lambda)$, to then estimate the ASE-noise contribution $N_{ASE}$ and the signal deformation function $k(\lambda)$.

Steps 602, 604 and 606 are respectively equivalent to steps 502, 504 and 506 and will therefore not be repetitively described. The results of those steps are a test optical spectrum trace $P_{SUT}(\lambda)$ of the SUT to be characterized and a reference optical spectrum trace $S_{ref}(\lambda)$ to which some preprocessing may have been applied.

The spectral deformation of the signal contribution $S(\lambda)$ of the SUT, as compared to the reference trace $S_{ref}(\lambda)$, is estimated in steps 608, 610, 612 and 614.

In step 608, a ratio $Rdev(\lambda)$ of the derivative of said test optical spectrum trace as a function of wavelength with respect to the derivative of said reference optical spectrum trace as a function of wavelength is calculated as follows:

$$Rdev(\lambda) = \frac{dP_{SUT}(\lambda)/d\lambda}{dS_{ref}(\lambda)/d\lambda} \quad (6.1)$$

In step 610, the extended noise contribution $N_E(\lambda)$ is estimated by finding $\langle k(\lambda) \rangle$, which is the average of $k(\lambda)$ over the optical signal bandwidth. It follows from equation (5.1) that:

$$\langle k(\lambda) \rangle = \langle Rdev(\lambda) \rangle \quad (6.2)$$

We then find:

$$N_E(\lambda) = P_{SUT}(\lambda) - \langle Rdev(\lambda) \rangle \cdot S_{ref}(\lambda) \tag{6.3}$$

It is noted that an estimation of $\langle k(\lambda) \rangle$ can be found by averaging $Rdev(\lambda)$ over a spectral range that does not necessarily correspond to the optical signal bandwidth. Furthermore, because the function $Rdev(\lambda)$ is typically noisy around the peak wavelength of the SUT, this region should be avoided. In the case of typical 100G PM-QPSK signals, a spectral region corresponding to an offset of 5 GHz to 10 GHz from the peak wavelength is often suitable for averaging.

Having estimated $\langle k(\lambda) \rangle$, the extended noise contribution $N_E(\lambda)$ may be calculated over a spectral region greater than that used for averaging.

Knowing that the spectral deformation is of the broadening type, the ASE-noise contribution $N_{ASE}$ can be estimated by a minimum point of the extended noise contribution $N_E(\lambda)$. In step 612, the ASE-noise contribution $N_{ASE}$ is calculated as the minimum of the extended noise contribution $N_E(\lambda)$ calculated in step 610, within a central portion of the SUT. Again, in the case of a typical 100G PM-QPSK signal, a spectral range extending from −5 GHz to +5 GHz relative to the peak wavelength of the SUT may be used to determine the minimum.

Using the estimated ASE-noise level, the signal deformation function $k(\lambda)$ may be calculated. In step 614, the signal deformation function $k_e(\lambda)$ is calculated over any suitable spectral range as follows:

$$k_e(\lambda) = \frac{P_{SUT}(\lambda) - N_{ASE}}{S_{ref}(\lambda)} \tag{6.4}$$

The resulting signal deformation function $k(\lambda)$ provides an estimation of the spectral deformation of the signal contribution of the SUT.

In step 618, the signal contribution $S(\lambda)$ of the SUT may be calculated if required for the quality parameters to be evaluated. The signal contribution $S(\lambda)$ may be calculated as:

$$S(\lambda) = k_e(\lambda) \cdot S_{ref}(\lambda) \tag{6.5}$$

In step 620, one or more quality parameters characterizing the SUT are determined from the calculated signal deformation function $k(\lambda)$, the ASE-noise contribution $N_{ASE}$ and the signal contribution $S(\lambda)$. For example, any of the various quality parameters defined hereinabove may be determined. Of course, other quality parameters could be determined as well.

It should be appreciated that other variations of the methods provided herein are also envisaged. For example, the spectral deformation could be determined by first estimating the signal deformation function $k(\lambda)$ at the peak wavelength of the SUT using a ratio $R2dev(\lambda)$, this ratio representing the second derivative of the test optical spectrum trace $P_{SUT}(\lambda)$ as a function of wavelength with respect to the second derivative of the reference optical spectrum trace $S_{ref}(\lambda)$ as a function of wavelength:

$$R2dev(\lambda) = \frac{d^2 P_{SUT}(\lambda)/d\lambda^2}{d^2 S_{ref}(\lambda)/d\lambda^2} \tag{6.6}$$

Similarly to the ratio $Rdev(\lambda)$ defined hereinabove, $R2dev(\lambda)$ also provides an estimation of the signal deformation function $k(\lambda)$ that is indicative of the spectral deformation of the signal contribution. However, contrary to ratio $Rdev(\lambda)$, ratio $R2dev(\lambda)$ does not exhibit a discontinuity at the peak wavelength of the SUT. Furthermore, it can be shown that this ratio $R2dev(\lambda)$ is a direct evaluation of the signal deformation function $k(\lambda)$ at the peak wavelength $\lambda_{pk}$ of the SUT, i.e. where the derivative and the second derivative of $k(\lambda)$ may be neglected:

$$R2dev(\lambda_{pk}) = k(\lambda_{pk}) \tag{6.7}$$

From the thereby determined $k(\lambda_{pk})$ and assuming that the ASE-noise level is substantially constant in wavelength, it is then possible to estimate this ASE noise level:

$$N_{ASE} = N_{ASE}(\lambda_{pk}) = P_{SUT}(\lambda_{pk}) - k(\lambda_{pk}) \cdot S_{ref}(\lambda_{pk}) \tag{6.8}$$

As in steps 516 hereinabove, the estimated signal deformation function $k_e(\lambda)$ may then be calculated over a suitable spectral range as follows:

$$k_e(\lambda) = \frac{P_{SUT}(\lambda) - N_{ASE}}{S_{ref}(\lambda)} \tag{6.9}$$

Figure 7:
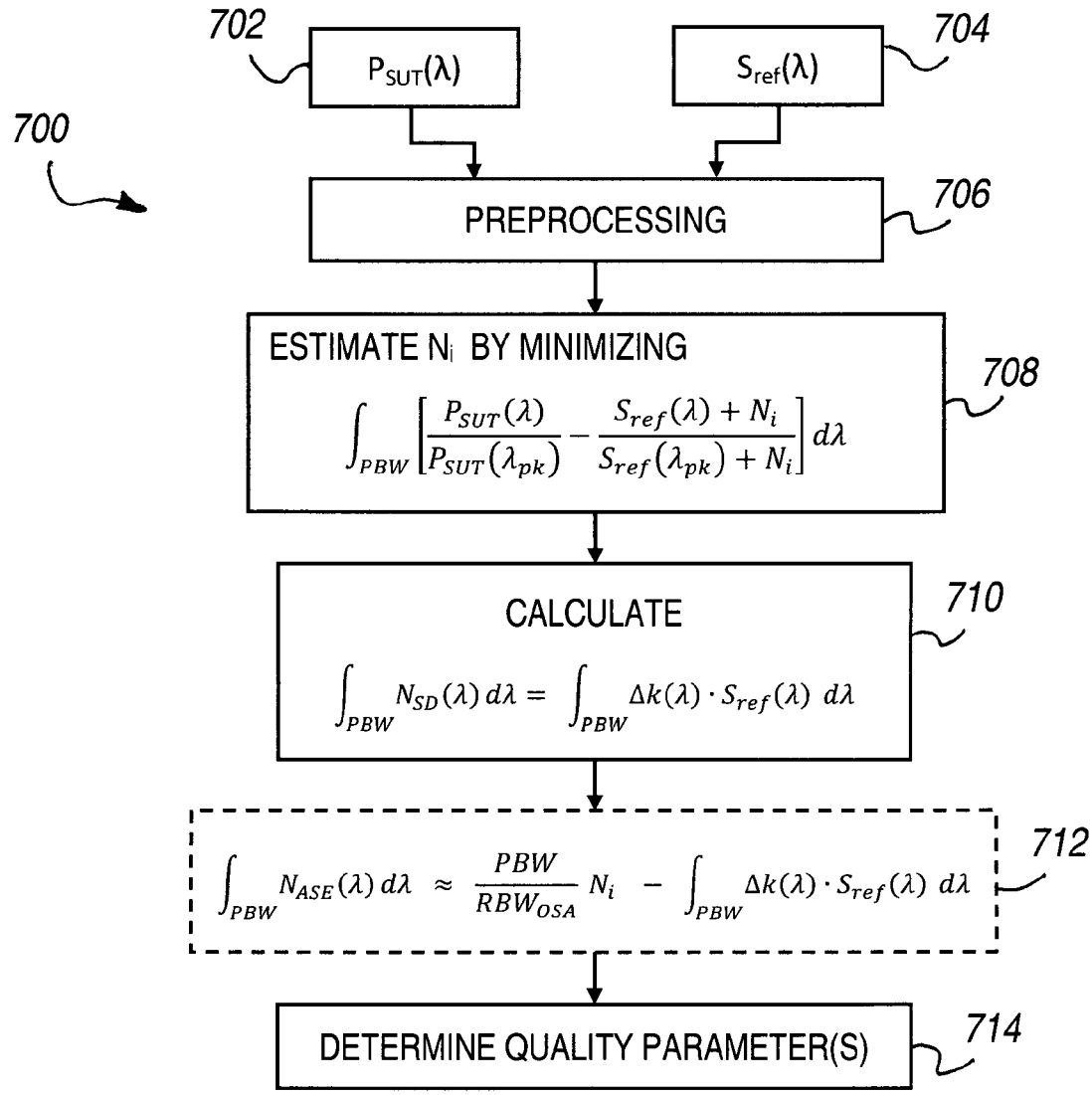
FIG. 7 is a flowchart illustrating a method for determining a quality parameter characterizing a polarization-multiplexed signal-under-test, in accordance with a third embodiment.

FIG. 7 illustrates yet another embodiment of the method 400 described hereinabove for determining a quality parameter characterizing a polarization-multiplexed SUT. The method 700 of FIG. 7 gives another specific implementation algorithm of how the test trace $P_{SUT}(\lambda)$ and the reference trace $S_{ref}(\lambda)$ may be processed to estimate the spectral deformation $k(\lambda)$ of the signal contribution of the SUT as compared to the reference trace and/or the ASE-only noise comprised in the SUT. This embodiment relies on an iterative algorithm that integrates the signal and noise spectrum over the channel bandwidth in order to directly determine the integrated ASE noise $N_{ASE}$ and signal deformation noise. This embodiment further relies on the principle that there is no need to spectrally resolve the ASE noise and the spectral deformation noise $N_{SD}(\lambda)$ in order to determine the OSNR, considering the ASE-only OSNR ($OSNR_{ASE}$), the spectral deformation OSNR ($OSNR_{SD}$) or the extended OSNR ($OSNR_E$) as defined hereinabove.

Steps 702, 704 and 706 are respectively equivalent to steps 502, 504 and 506 and will therefore not be repeatedly described. The result of those steps are a test optical spectrum trace $P_{SUT}(\lambda)$ of the SUT to be characterized and a reference optical spectrum trace $S_{ref}(\lambda)$ to which some preprocessing may have been applied.

In steps 708 and 710, the integrated spectral deformation noise $\int N_{SD}(\lambda)$ comprised in the SUT is estimated, i.e. integrated over the channel bandwidth of interest (or more specifically over a processing bandwidth (PBW) corresponding approximately to the optical signal bandwidth of the SUT or to a substantial portion thereof, e.g. in the case of a 100G PM-QPSK signal, a spectral range extending between −10G and +10G relative to the peak wavelength of the SUT).

More specifically, in step 708, the integrated extended noise contribution $\int N_E(\lambda)$ is estimated from the test trace $P_{SUT}(\lambda)$ and the reference trace $S_{ref}(\lambda)$ by applying an iterative method that varies a constant value $N_i$ to minimize the following error function:

$$\int_{PBW} \left[ \frac{P_{SUT}(\lambda)}{P_{SUT}(\lambda_{pk})} - \frac{S_{ref}(\lambda) + N_i}{S_{ref}(\lambda_{pk}) + N_i} \right] d\lambda \tag{7.1}$$

where the integration is performed over the processing bandwidth PBW and where $N_i$ provides an estimation of the extended noise contribution as integrated over the processing bandwidth PBW:

$$\int_{PBW} N_E(\lambda)\,d\lambda \approx \frac{PBW}{RBW_{OSA}} N_i \quad (7.2)$$

where $RBW_{OSA}$ corresponds to the resolution bandwidth of the OSA from which the test trace was acquired.

This can be done, for instance, by initially pausing $N_i=0$ and increasing the value of $N_i$ until the error function is minimized.

The solution $N_i$ then found provides an estimate of the integrated extended noise contribution $\int N_E(\lambda)$, which value may readily provide a useful parameter in some applications or from which the extended OSNR ($OSNR_E$) may be readily calculated as explained hereinbelow.

However, the extended noise comprises the contribution of both the spectral deformation noise and the ASE-noise. In order to specifically characterize either one or the other, its specific contribution should be identified. Accordingly, in step 710, the integrated spectral deformation noise $\int N_{SD}(\lambda)$ is estimated from the ratio $Rdev(\lambda)$ of the derivative of the test trace $P_{SUT}(\lambda)$ to the derivative of the reference trace $S_{ref}(\lambda)$ as follows:

$$\int_{PBW} N_{SD}(\lambda)\,d\lambda = \int_{PBW} (k(\lambda)-k_0)\cdot S_{ref}(\lambda)\,d\lambda = \int_{PBW} \Delta k(\lambda)\cdot S_{ref}(\lambda)\,d\lambda \quad (7.3)$$

where $k(\lambda)$ is estimated from $Rdev(\lambda)$ as described hereinabove in reference to FIG. 4.

Optionally, in step 712, the integrated ASE noise is estimated by removing the spectral deformation contribution as estimated in step 710 from the integrated extended noise:

$$\int_{PBW} N_{ASE}(\lambda)\,d\lambda = \int_{PBW} N_E(\lambda)\,d\lambda - \int_{PBW} N_{SD}(\lambda)\,d\lambda \quad (7.4)$$

$$\int_{PBW} N_{ASE}(\lambda)\,d\lambda \approx \frac{PBW}{RBW_{OSA}} N_i - \int_{PBW} \Delta k(\lambda)\cdot S_{ref}(\lambda)\,d\lambda \quad (7.5)$$

In step 714, one or more quality parameters characterizing the SUT are determined. For instance, the extended OSNR ($OSNR_E$) (normalized to be equivalent to that corresponding to a 0.1-nm resolution bandwidth), which takes into account both the ASE-noise contribution $N_{ASE}(\lambda)$ and the spectral deformation noise $N_{SD}(\lambda)$, may be readily determined from the integrated extended noise contribution $\int N_E(\lambda)$ obtained in step 708, as follows:

$$OSNR_E = 10\log_{10}\left(\frac{\int_{CBW} S(\lambda)\,d\lambda}{\frac{0.1\,nm}{PBW}\int_{PBW} N_E(\lambda)\,d\lambda}\right) \quad (7.6)$$

$$= 10\log_{10}\left(\frac{\int_{CBW} P_{SUT}(\lambda)\,d\lambda - \frac{CBW}{RBW_{OSA}} N_i}{\frac{0.1\,nm}{RBW_{OSA}} N_i}\right)$$

wherein the hereinabove defined bandwidth NBW here corresponds to the processing bandwidth PBW.

The spectral deformation OSNR ($OSNR_{SD}$) (normalized to be equivalent to that corresponding to a 0.1-nm resolution bandwidth) may also be determined, from the integrated spectral deformation noise $\int N_{SD}(\lambda)$ estimated in step 710:

$$OSNR_{SD} = 10\log_{10}\left(\frac{\int_{CBW} S(\lambda)\,d\lambda}{\frac{0.1\,nm}{PBW}\int_{PBW} N_{SD}(\lambda)\,d\lambda}\right) \quad (7.7)$$

$$= 10\log_{10}\left(\frac{\int_{CBW} P_{SUT}(\lambda)\,d\lambda - \frac{CBW}{RBW_{OSA}} N_i}{\frac{0.1\,nm}{PBW}\int_{PBW} \Delta k(\lambda)\cdot S_{ref}(\lambda)\,d\lambda}\right)$$

Furthermore, the ASE-noise OSNR ($OSNR_{ASE}$) (normalized to be equivalent to that corresponding to a 0.1-nm resolution bandwidth) may be determined from the integrated ASE noise $\int N_{ASE}(\lambda)$ estimated in step 712:

$$OSNR_{ASE} = 10\log_{10}\left(\frac{\int_{CBW} S(\lambda)\,d\lambda}{\frac{0.1\,nm}{PBW}\int_{PBW} N_{ASE}(\lambda)\,d\lambda}\right) \quad (7.8)$$

$$= 10\log_{10}\left(\frac{\int_{CBW} P_{SUT}(\lambda)\,d\lambda - \frac{CBW}{RBW_{OSA}} N_i}{\frac{0.1\,nm}{RBW_{OSA}} N_i - \frac{0.1\,nm}{PBW}\int_{PBW} \Delta k(\lambda)\cdot S_{ref}(\lambda)\,d\lambda}\right)$$

Of course, other quality parameters may be calculated in addition or in alternative to these parameters.

It is noted that all the equations provided herein as a function of wavelength, denoted $\lambda$, could be adapted to be expressed as a function of optical frequency, denoted $\nu$, wave number, or the like. Accordingly, all the equations given herein could be readily adapted to find their equivalent as functions of the frequency or wave number. Similarly, the derivatives of the test trace $P_{SUT}(\lambda)$ and of the reference trace $S_{ref}(\lambda)$, calculated as a function of wavelength in step 406 of the method 400 of FIG. 4 and in the specific embodiments described herein, could of course be performed as a function of other parameters such as the optical frequency or the wave number.

Also, it should be appreciated that, although the above examples employ optical taps to measure the signal at the respective tap points, the measurement of the spectrally-resolved optical power is not limited to such a "non-invasive" approach and may be undertaken by temporarily disrupting the continuity of the optical path (e.g. via an optical switch, or by physically disconnecting optical connectors). Such an approach may be acceptable for an optical channel not carrying customer traffic (e.g. during commissioning), especially if, for instance, many other DWDM channels are present to minimize the effect of resulting changes in the loading of the optical amplifiers in the network.

Furthermore, some example methods described herein assume a uniform ASE-noise contribution over the optical signal bandwidth in order to estimate the spectral deformation of the signal contribution of the SUT. The ASE-noise contribution is usually not totally uniform, and consequently the presence of some non-uniformity will typically result in an error (i.e. uncertainty) on the estimation of the spectral deformation. The level of acceptable non-uniformity hence depends on the level of acceptable error on the quality parameters to be characterized.

It should be appreciated that the methods described above are not limited to the characterization of an optical signal having a unique signal carrier wavelength. The SUT to be characterized may include a plurality of data-carrying signal contributions multiplexed using Nyquist Wavelength Division Multiplexing (N-WDM) (also referred to as "super-channels" in the scientific literature, such as dual carrier PM-16-QAM which is currently deployed for 400G transmission) or All-Optical Orthogonal Frequency-Division Multiplexing (OFDM), for example, provided that the signal contribution variation of such an SUT is significantly greater than the ASE-noise variation on at least a portion of the optical signal bandwidth.

Monitoring Applications

Although the above description of FIG. 2 refers to portable test instruments (such as portable OSAs), it should be mentioned that the signal characterization methods described herein is particularly useful in the case of monitoring applications which employ fixed (as opposed to portable) test instruments. Referring to FIG. 2, in this case a monitoring instrument, which would include an OSA, should be placed at at least two physical locations along the optical communication link, e.g. 100, in order to provide the test trace $P_{SUT}(\lambda)$ and the reference trace $S_{ref}(\lambda)$. For instance, a first monitoring instrument could be installed at tap 1 in order to acquire the reference trace $S_{ref}(\lambda)$, and a second monitoring instrument at tap 2, 3, 4 or 5 in order to acquire the test trace $P_{SUT}(\lambda)$.

Of course, multiple monitoring instruments could be installed along the optical communication link 100, i.e. at tap 1, 2, 3, 4 and 5, thereby allowing characterization of the propagating optical signals at different point along the optical communication link 100. In troubleshooting for example, the evolution of the quality parameters from points to points may then easily allow identification of a problematic segment on the optical communication link 100.

It should be noted that, in this case, the test trace $P_{SUT}(\lambda)$ and the reference trace $S_{ref}(\lambda)$ are not acquired with the same test instruments and the monitoring instruments need to either communicate together or with an external computing device. In this respect, data exchange between the monitoring instruments or to an external computing device may be done through the network under test itself or any other wireline or wireless network (e.g., 3G, WiMax, 4G/LTE cellular network, etc.). Once the optical spectrum traces are acquired by the monitoring instruments, these may be sent, for instance, to a cloud-based application for processing according to the herein-described characterization methods.

Furthermore, since the test trace $P_{SUT}(\lambda)$ and the reference trace $S_{ref}(\lambda)$ are not acquired with the same test instruments in this case, an inter-OSA calibration may be required. In the case of a heterodyne OSA or a Fourier Transform OSA (FFT OSA) for example, the inter-OSA calibration may be limited to an alignment in wavelength of the test trace $P_{SUT}(\lambda)$ and the reference trace $S_{ref}(\lambda)$. However, in the case of a monochromator-based OSA, such as a grating-based OSA, it may be required to correct the acquired optical spectrum traces in signal processing to compensate for any difference in the filter function of the OSAs. A calibration may be required to characterize the filter functions or the filter function difference.

The embodiments described above are intended to be exemplary only. The scope of the invention is therefore intended to be limited solely by the appended claims.

What is claimed is:

1. A method for determining a quality parameter characterizing a polarization-multiplexed optical signal-under-test (SUT) propagating on an optical communication link and comprising at least a data-carrying signal contribution and an Amplified Spontaneous Emission (ASE) noise contribution within an optical signal bandwidth, the method comprising:

measuring, using an optical spectrum analyzer, a test optical spectrum trace of said optical signal-under-test corresponding to a test point along said optical communication link, said test optical spectrum trace extending over a spectral range encompassing at least a portion of said optical signal bandwidth;

using a computing device:

obtaining a reference optical spectrum trace corresponding to a reference signal;

estimating a spectral deformation of said signal contribution of said signal-under-test compared to said reference optical spectrum trace, within said spectral range, using said reference optical spectrum trace and said test optical spectrum trace, wherein the spectral deformation is at least partially induced by non-linear effects; and determining said quality parameter at least from the estimated spectral deformation; and outputting the determined quality parameter.

2. The method as claimed in claim 1, wherein said estimating the spectral deformation of said signal contribution of said signal-under-test comprises calculating a ratio Rdev(a) of a derivative of said test optical spectrum trace with respect to a derivative of said reference optical spectrum trace.

3. The method as claimed in claim 2, wherein said estimating the spectral deformation of said signal contribution of said signal-under-test comprises calculating a signal deformation function k(a), defined as a ratio of the signal contribution of said signal-under-test with respect to said reference optical spectrum trace, using a formula providing a result equivalent to the following:

$$k(\lambda) \approx Rdev(\lambda) - \frac{1}{2} \cdot \frac{dRdev(\lambda)}{d\lambda} \cdot \frac{S_{ref}(\lambda)}{dS_{ref}(\lambda)/d\lambda}$$

with $$Rdev(\lambda) = \frac{dP_{SUT}(\lambda)/d\lambda}{dS_{ref}(\lambda)/d\lambda}$$

wherein $Ps_{UT}(A)$ is said test optical spectrum trace and Sref($\lambda$) is said reference optical spectrum trace.

4. The method as claimed in claim 3, further comprising estimating said data-carrying signal contribution by multiplying said signal deformation function k($\lambda$) by said reference optical spectrum trace.

5. The method as claimed in claim 4, further comprising estimating said ASE-noise contribution by subtracting the estimated data-carrying signal contribution from said test optical spectrum trace.

6. The method as claimed in claim 2, wherein said estimating the spectral deformation of said signal contribution of said signal-under-test comprises:

calculating a signal deformation function k(a) defined as a ratio of the signal contribution of said signal-under-test with respect to said reference optical spectrum trace;

calculating an extended noise contribution NE(A) in said test optical spectrum trace representing said ASE-noise contribution and a spectral deformation noise contribution wherein $$N_E(\lambda)=P_{SUT}(\lambda)-k_0 \cdot S_{ref}(\lambda)$$

wherein $Ps_{UT}(\lambda)$ is said test optical spectrum trace and $Sref(\lambda)$ is said reference optical spectrum trace, $k_o$ corresponding to either the value of $k(\lambda)$ at the signal peak or the average of $k(\lambda)$ over said spectral range.

7. The method as claimed in claim 6, wherein said estimating the spectral deformation of said signal contribution of said signal-under-test further comprises:
estimating said ASE-noise contribution by calculating the minimum of said global noise contribution $N_E(\lambda)$ in a processing optical bandwidth within said spectral range.

8. The method as claimed in claim 7, wherein said estimating the spectral deformation of said signal contribution of said signal-under-test further comprises calculating a signal deformation function $k(\lambda)$ defined as follows:

$$k(\lambda) = \frac{P_{SUT}(\lambda) - N_{ASE}}{S_{ref}(\lambda)}$$

wherein $N_{ASE}$ is the estimated ASE-noise contribution.

9. The method as claimed in claim 1, further comprising:
mathematically discriminating said ASE-noise contribution from said signal contribution in said signal-under-test, within said spectral range, using said reference optical spectrum trace and said test optical spectrum trace; and
determining said quality parameter at least from the mathematically discriminated ASE-noise contribution.

10. The method as claimed in claim 9, wherein said quality parameter is an ASE-only Optical Signal-to-Noise Ratio ($OSNR_{ASE}$) which is determined from the mathematically discriminated signal and noise contributions.

11. The method as claimed in claim 1, wherein said reference signal is acquired at a reference point along said optical communication link, which is different from said test point, said reference signal originating from an optical transmitter that is at a source of said optical signal-under-test.

12. The method as claimed in claim 11, wherein said reference signal comprises a noise contribution, and wherein said reference optical spectrum trace is free of ASE noise and is calculated from an acquired optical spectrum trace of said reference signal and an estimated Optical Signals to ASE-Noise Ratio ($OSNR_{ASE}$) of said reference signal.

13. The method as claimed in claim 1, wherein said reference signal is acquired at said test point along said optical communication link but at a prior time and wherein said reference signal comprises a previously-estimated ASE-noise contribution.

14. The method as claimed in claim 1, wherein said reference trace is acquired in proximity to the output of a first optical transmitter, for which the relative spectral characteristics are substantially representative of that of a second optical transmitter from which said optical signal-under-test originates, the first optical transmitter being distinct from the second optical transmitter.

15. The method as claimed in claim 1, wherein at least one of said test optical spectrum trace and said reference optical spectrum trace are obtained via monitoring taps disposed on said optical communication link.

16. The method as claimed in claim 1, wherein said quality parameter is a signal deformation factor.

17. The method as claimed in claim 1, wherein said quality parameter is a signal-deformation-only Optical Signal-to-Noise Ratio ($OSNR_{SD}$).

18. The method as claimed in claim 1, wherein said test optical spectrum trace is acquired using a grating-based optical spectrum analyzer.

19. The method as claimed in claim 1, wherein said test optical spectrum trace is acquired using a heterodyne optical spectrum analyzer.

20. A non-transitory computer readable storage medium having stored thereon computer-readable instructions that, when executed by a computer, cause the computer to perform a method for determining a quality parameter characterizing a polarization-multiplexed optical signal-under-test (SUT) propagating on an optical communication link and comprising at least a data-carrying signal contribution and an Amplified Spontaneous Emission (ASE) noise contribution within an optical signal bandwidth, the method comprising:
obtaining a test optical spectrum trace of said optical signal-under-test corresponding to a test point along said optical communication link, said test optical spectrum trace extending over a spectral range encompassing at least a portion of said optical signal bandwidth;
obtaining a reference optical spectrum trace corresponding to a reference signal;
estimating a spectral deformation of said signal contribution of said signal-under-test compared to said reference optical spectrum trace, within said spectral range, using said reference optical spectrum trace and said test optical spectrum trace, wherein the spectral deformation is at least partially induced by non-linear effects;
determining said quality parameter at least from the estimated spectral deformation; and
outputting the determined quality parameter.

21. An apparatus for determining a quality parameter characterizing a polarization-multiplexed optical signal-under-test (SUT) propagating on an optical communication link and comprising at least a data-carrying signal contribution and an Amplified Spontaneous Emission (ASE) noise contribution within an optical signal bandwidth, the apparatus comprising:
a measurement device for obtaining a test optical spectrum trace of said optical signal-under-test corresponding to a test point along said optical communication link, said test optical spectrum trace extending over a spectral range encompassing at least a portion of said optical signal bandwidth;
an input for receiving a reference optical spectrum trace corresponding to a reference signal;
a processing unit for estimating a spectral deformation of said signal contribution of said signal-under-test compared to said reference optical spectrum trace, within said spectral range, using said reference optical spectrum trace and said test optical spectrum trace, wherein the spectral deformation is at least partially induced by non-linear effects;
an in-band noise determining unit for determining said quality parameter at least from the estimated spectral deformation; and
an output for outputting the determined quality parameter.

* * * * *